US008582628B2

(12) United States Patent
Ozawa et al.

(10) Patent No.: US 8,582,628 B2
(45) Date of Patent: Nov. 12, 2013

(54) TRANSMITTING APPARATUS, RECEIVING APPARATUS, TRANSMITTING/RECEIVING SYSTEM, AND IMAGE DISPLAY SYSTEM

(75) Inventors: Seiichi Ozawa, Wako (JP); Hironobu Akita, Chiyoda-ku (JP)

(73) Assignee: Thine Electronics, Inc., Tokyo (JP)

( * ) Notice: Subject to any disclaimer, the term of this patent is extended or adjusted under 35 U.S.C. 154(b) by 196 days.

(21) Appl. No.: 13/148,856

(22) PCT Filed: Oct. 20, 2010

(86) PCT No.: PCT/JP2010/068510
§ 371 (c)(1),
(2), (4) Date: Aug. 10, 2011

(87) PCT Pub. No.: WO2011/052456
PCT Pub. Date: May 5, 2011

(65) Prior Publication Data
US 2011/0317747 A1    Dec. 29, 2011

(30) Foreign Application Priority Data
Oct. 26, 2009  (JP) .................................. 2009-245471

(51) Int. Cl.
*H04B 1/38*    (2006.01)

(52) U.S. Cl.
USPC ...... 375/219; 375/316; 375/295; 375/240.01; 375/240.26; 375/240.28; 375/354; 375/355; 375/357; 375/358; 375/360; 375/362; 375/373; 375/375

(58) Field of Classification Search
USPC .......... 375/316, 295, 240.01, 240.26, 240.28, 375/354, 355, 357, 358, 360, 362, 373, 375
See application file for complete search history.

(56) References Cited

U.S. PATENT DOCUMENTS

| 7,613,237 | B1 * | 11/2009 | Talbot | 375/226 |
|---|---|---|---|---|
| 8,159,887 | B2 * | 4/2012 | Kizer et al. | 365/193 |
| 2005/0276261 | A1 * | 12/2005 | Kim et al. | 370/389 |
| 2011/0235763 | A1 * | 9/2011 | Palmer et al. | 375/362 |
| 2011/0239030 | A1 * | 9/2011 | Ware et al. | 713/400 |

FOREIGN PATENT DOCUMENTS

| JP | 11-177540 A | 7/1999 |
|---|---|---|
| JP | 2005-338727 A | 12/2005 |

OTHER PUBLICATIONS

Kizer et al., PCT/US2008/005135, Clcock Synchronization in a Memory System, Published on Oct. 30, 2008.*
International Preliminary Report on Patentability issued in International Application No. PCT/JP2010/068510 dated May 18, 2012.

* cited by examiner

*Primary Examiner* — Siu Lee
(74) *Attorney, Agent, or Firm* — Sughrue Mion, PLLC

(57) ABSTRACT

A data reception unit 21 of a reception device $20_n$ receives calibration data to detect a data reception state or a clock reception state in the reception device $20_n$ from a data transmission unit 11 of a transmission device 10. A decoder unit 24 causes a transmission unit 26 to send out calibration sample data that a sampler unit 23 obtained by sampling calibration data to the transmission device 10. A control unit 15 of the transmission device 10 detects a data reception state or a clock reception state in the reception device $20_n$ based on calibration sample data received from the reception device $20_n$ and controls the data transmission unit 11 and a clock transmission unit 12 based on the detection result.

18 Claims, 31 Drawing Sheets

*Fig.11*

| D1 | XD | D2 | Judge | Edge | Early | Late | Unlock |
|---|---|---|---|---|---|---|---|
| 0 | 0 | 0 | WITHOUT Edge | 0 | 0 | 0 | 0 |
| 0 | 0 | 1 | WITH Edge/DataLate | 1 | 0 | 1 | 0 |
| 0 | 1 | 0 | WITHOUT Edge/Unlock | 0 | 0 | 0 | 1 |
| 0 | 1 | 1 | WITH Edge/DataEarly | 1 | 1 | 0 | 0 |
| 1 | 0 | 0 | WITH Edge/DataEarly | 1 | 1 | 0 | 0 |
| 1 | 0 | 1 | WITHOUT Edge/Unlock | 0 | 0 | 0 | 1 |
| 1 | 1 | 0 | WITH Edge/DataLate | 1 | 0 | 1 | 0 |
| 1 | 1 | 1 | WITHOUT Edge | 0 | 0 | 0 | 0 |

Fig.14

| D0 | D1 | XD | D2 | Judge | Edge | Underequalize | Overequalize | Unlock |
|----|----|----|----|-------|------|---------------|--------------|--------|
| 0 | 0 | 0 | 0 | WITHOUT Edge | 0 | 0 | 0 | 0 |
| 0 | 0 | 0 | 1 | WITH Edge/ Underequalize | 1 | 1 | 0 | 0 |
| 0 | 0 | 1 | 0 | WITHOUT Edge/ Unlock | 0 | 0 | 0 | 1 |
| 0 | 0 | 1 | 1 | WITH Edge/ Overequalize | 1 | 0 | 1 | 0 |
| 0 | 1 | 0 | 0 | WITH Edge/ Underequalize | 1 | 1 | 0 | 0 |
| 0 | 1 | 0 | 1 | WITHOUT Edge/ Unlock | 0 | 0 | 0 | 1 |
| 0 | 1 | 1 | 0 | WITH Edge/ Overequalize | 1 | 0 | 1 | 0 |
| 0 | 1 | 1 | 1 | WITHOUT Edge | 0 | 0 | 0 | 0 |
| 1 | 0 | 0 | 0 | WITHOUT Edge | 0 | 0 | 0 | 0 |
| 1 | 0 | 0 | 1 | WITH Edge/ Overequalize | 1 | 0 | 1 | 0 |
| 1 | 0 | 1 | 0 | WITHOUT Edge/ Unlock | 0 | 0 | 0 | 1 |
| 1 | 0 | 1 | 1 | WITH Edge/ Underequalize | 1 | 1 | 0 | 0 |
| 1 | 1 | 0 | 0 | WITH Edge/ Overequalize | 1 | 0 | 1 | 0 |
| 1 | 1 | 0 | 1 | WITHOUT Edge/ Unlock | 0 | 0 | 0 | 1 |
| 1 | 1 | 1 | 0 | WITH Edge/ Underequalize | 1 | 1 | 0 | 0 |
| 1 | 1 | 1 | 1 | WITHOUT Edge | 0 | 0 | 0 | 0 |

*Fig.17*

| D1 | XD | D2 | Judge | Edge | DataDutyWide | DataDutyNarrow |
|---|---|---|---|---|---|---|
| 0 | 0 | 0 | WITHOUT Edge | 0 | 0 | 0 |
| 0 | 0 | 1 | WITH Edge/ DataDutyNarrow | 1 | 0 | 1 |
| 0 | 1 | 0 | WITHOUT Edge | 0 | 0 | 0 |
| 0 | 1 | 1 | WITH Edge/ DataDutyWide | 1 | 1 | 0 |
| 1 | 0 | 0 | WITH Edge/ DataDutyNarrow | 1 | 0 | 1 |
| 1 | 0 | 1 | WITHOUT Edge | 0 | 0 | 0 |
| 1 | 1 | 0 | WITH Edge/ DataDutyWide | 1 | 1 | 0 |
| 1 | 1 | 1 | WITHOUT Edge | 0 | 0 | 0 |

Fig.20

| Capture ClockEdge | D1 | XD | D2 | Judge | Edge | ClockDutyWide | ClockDutyNarrow |
|---|---|---|---|---|---|---|---|
| Rise | 0 | 0 | 0 | WITHOUT Edge | 0 | 0 | 0 |
| Rise | 0 | 0 | 1 | WITH Edge/ClockDutyWide | 1 | 1 | 0 |
| Rise | 0 | 1 | 0 | WITHOUT Edge/Unlock | 0 | 0 | 0 |
| Rise | 0 | 1 | 1 | WITH Edge/ClockDutyNarrow | 1 | 0 | 1 |
| Rise | 1 | 0 | 0 | WITH Edge/ClockDutyNarrow | 1 | 0 | 1 |
| Rise | 1 | 0 | 1 | WITHOUT Edge/Unlock | 0 | 0 | 0 |
| Rise | 1 | 1 | 0 | WITH Edge/ClockDutyWide | 1 | 1 | 0 |
| Rise | 1 | 1 | 1 | WITHOUT Edge | 0 | 0 | 0 |
| Fall | 0 | 0 | 0 | WITHOUT Edge | 0 | 0 | 0 |
| Fall | 0 | 0 | 1 | WITH Edge/ClockDutyNarrow | 1 | 0 | 1 |
| Fall | 0 | 1 | 0 | WITHOUT Edge/Unlock | 0 | 0 | 0 |
| Fall | 0 | 1 | 1 | WITH Edge/ClockDutyWide | 1 | 1 | 0 |
| Fall | 1 | 0 | 0 | WITH Edge/ClockDutyWide | 1 | 1 | 0 |
| Fall | 1 | 0 | 1 | WITHOUT Edge/Unlock | 0 | 0 | 0 |
| Fall | 1 | 1 | 0 | WITH Edge/ClockDutyNarrow | 1 | 0 | 1 |
| Fall | 1 | 1 | 1 | WITHOUT Edge | 0 | 0 | 0 |

TRANSMITTING APPARATUS, RECEIVING APPARATUS, TRANSMITTING/RECEIVING SYSTEM, AND IMAGE DISPLAY SYSTEM

TECHNICAL FIELD

The present invention relates to a transmission device, a reception device, a transmission/reception system, and an image display system.

BACKGROUND ART

An image display system, such as a liquid crystal display system, comprises a transmission device, a reception device, and an image display unit, in which the transmission device that has received an image signal from outside transmits image data and a clock to the reception device, the reception device samples the image data with the clock and sends out image data obtained by the sampling to a signal line, and the image display unit displays an image based on the image data sent out to the signal line. In the image display system, such as a liquid crystal display system, the transmission device or a device including the transmission device is generally called a "timing controller" and the reception device or a device including the reception device is called a "driver".

In such an image display system, it is important for the reception device to correctly sample image data with a clock. However, when a phase difference (skew) between data and a clock that have reached the reception device is large or when deterioration in the waveform of the data that has reached the reception device is serious, there is a case where it is not possible to correctly sample the data.

Patent Document 1 discloses the invention intended to solve the above problem of skew. According to the invention disclosed in Patent Document 1, information about the skew is stored in advance in the transmission device and when transmitting data and a clock, a predetermined phase difference between both is given based on the skew information and thereby it is attempted to reduce the skew between the data and the clock in the reception device.

CITATION LIST

Patent Literature

Patent Document 1: Japanese Patent Laid-Open No. 2005-338727

SUMMARY OF INVENTION

Technical Problem

However, according to the invention disclosed in Patent Document 1, it is necessary to store the skew in the reception device in advance in the transmission device for each image display system, and therefore, work and time are required to measure and store the skew. Further, the skew may vary depending on a change in the environment, such as a change in temperature, and therefore, there is a case where it is not possible to correctly sample data even with the skew stored by the work and time taken. Furthermore, according to the invention disclosed in Patent Document 1, it is intended to solve the problem of skew, however, it is not possible to solve the problem of the deterioration in the waveform of data in the reception device. As described above, according to the invention disclosed in Patent Document 1, it is not easy for the reception device to correctly sample image data with a clock.

The present invention has been made in order to solve the above-mentioned problems and an object thereof is to provide a transmission device and a reception device facilitating correctly sampling data with a clock in the reception device. Another object is to provide a transmission/reception system comprising such a transmission device and a reception device, and an image display system comprising such a transmission device, a reception device, and an image display unit.

Solution to Problem

A transmission device according to the present invention is one that transmits data and a clock to a reception device and characterized by comprising (1) a data transmission unit that transmits data to the reception device, (2) a clock transmission unit that transmits a clock to the reception device, (3) a reception unit that receives data from the reception device, and (4) a control unit that controls data transmission by the data transmission unit and clock transmission by the clock transmission unit. Further, the transmission device according to the present invention is characterized in that the control unit (a) causes the data transmission unit to transmit normal data, calibration data to detect a data reception state or a clock reception state in the reception device, calibration start instruction data to instruct the reception device to start transmission of the calibration data, and transmission instruction data to instruct the reception device to send out calibration sample data that the reception device obtained by sampling the calibration data, respectively, to the reception device at predetermined timings, and (b) controls, when the reception unit receives the calibration sample data sent out from the reception device, any one or more of an adjustment of a phase between data transmitted by the data transmission unit and a clock transmitted by the clock transmission unit, an adjustment of an amplitude of data transmitted by the data transmission unit, an adjustment of duty of data transmitted by the data transmission unit, and an adjustment of duty of a clock transmitted by the clock transmission unit based on the received calibration sample data.

A reception device according to the present invention is one that receives data and a clock from the transmission device characterized by comprising (1) a data reception unit that receives data from the transmission device, (2) a clock reception unit that receives a clock from the transmission device, (3) a sampler unit that samples data received by the data reception unit with a clock received by the clock reception unit and outputs data obtained by the sampling, (4) a decoder unit that decodes data output from the sampler unit, (5) a storage unit that stores part of data output from the sampler unit, and (6) a transmission unit that transmits data stored by the storage unit. Further, the reception device according to the present invention is characterized in that (a) the data reception unit receives normal data, calibration data to detect a data reception state in the data reception unit or a clock reception state in the clock reception unit, calibration start instruction data to instruct the start of reception of the calibration data, and transmission instruction data to instruct the transmission unit to send out calibration sample data that the sampler unit obtained by sampling the calibration data, respectively, from the transmission device at predetermined timings, and (b) the decoder unit causes, when data output from the sampler unit is the calibration start instruction data, the storage unit to store calibration sample data that the sampler unit obtained afterward by sampling the calibration data and further causes, when data output afterward from the sampler unit is the transmission instruction data, the transmission unit to send out the calibration sample data stored by the storage unit.

A transmission/reception system according to the present invention is characterized (1) by comprising the transmission device according to the above-mentioned present invention and the reception device according to the above-mentioned present invention and in that (2) the data reception unit of the reception device receives data transmitted by the data transmission unit of the transmission device, (3) the clock reception unit of the reception device receives a clock transmitted by the clock transmission unit of the transmission device, and (4) the reception unit of the transmission device receives calibration sample data transmitted by the transmission unit of the reception device.

The transmission/reception system comprising the transmission device and the reception device according to the present invention operates as follows. Data transmitted from the data transmission unit of the transmission device is received by the data reception unit of the reception device. A clock transmitted from the clock transmission unit of the transmission device is received by the clock reception unit of the reception device. In the sampler unit of the reception device, data received by the data reception unit is sampled with a clock received by the clock reception unit and data obtained by the sampling is output.

In the transmission device, data transmission by the data transmission unit and clock transmission by the clock transmission unit are controlled by the control unit. From the data transmission unit controlled by the control unit to the reception device, normal data, calibration data to detect a data reception state or a clock reception state in the reception device, calibration start instruction data to instruct the reception device to start transmission of the calibration data, and transmission instruction data to instruct the reception device to send out calibration sample data that the reception device obtained by sampling calibration data, are transmitted, respectively, at predetermined timings.

In the reception device, normal data, calibration data, calibration start instruction data, and transmission instruction data transmitted from the data transmission unit of the transmission device are received by the data reception unit, sampled by the sampler unit, and decoded by the decoder unit. By the decoder unit, when data output from the sampler unit is calibration start instruction data, calibration sample data that the sampler unit obtained afterward by sampling calibration data is stored in the storage unit and further, when data output afterward from the sampler unit is transmission instruction data, the calibration sample data stored by the storage unit is sent out from the transmission unit to the transmission device.

In the transmission device that has received calibration sample data sent out from the reception device by the reception unit, the control unit controls any one or more of an adjustment of a phase between data transmitted by the data transmission unit and a clock transmitted by the clock transmission unit, an adjustment of an amplitude of data transmitted by the data transmission unit, an adjustment of duty of data transmitted by the data transmission unit, and an adjustment of duty of a clock transmitted by the clock transmission unit based on the received calibration sample data.

In the transmission device according to the present invention, it is preferable for the control unit to cause the data transmission unit to transmit calibration data in which an inter-bit transition exists in a position shifted by an amount corresponding to less than one bit (preferably, corresponding to 0.5 bits) relative to clock transmission by the clock transmission unit when causing the data transmission unit to transmit calibration data compared to when causing the data transmission unit to transmit normal data, calibration start instruction data, and transmission instruction data, respectively. Further, in the reception device according to the present invention, it is preferable for the data reception unit to receive calibration data in which an inter-bit transition exists in a position shifted by an amount corresponding to less than one bit (preferably, corresponding to 0.5 bits) relative to a clock received by the clock reception unit when receiving calibration data from the transmission device compared to when receiving normal data, calibration start instruction data, and transmission instruction data, respectively, from the transmission device. It may also be possible to shift the phase of data based on the phase of a clock or shift the phase of a clock based on the phase of data.

In the transmission device according to the present invention, it is preferable for the control unit to set a frequency of a clock to be transmitted from the clock transmission unit to half a bit rate of data caused to be transmitted from the data transmission unit. Further, in the reception device according to the present invention, it is preferable for the sampler unit to sample data received by the data reception unit at timings of both rise and fall of a clock received by the clock reception unit.

In the transmission device according to the present invention, it is preferable for the control unit to cause the data transmission unit to transmit data in which the same code continues in a predetermined number of bits or more to the reception device as calibration start instruction data. Further, in the reception device according to the present invention, it is preferable for the decoder unit to recognize data in which the same code continues in a predetermined number of bits or more of the data output from the sampler unit as calibration start instruction data. When the same code does not continue in K successive bits or more in the normal data, a value equal to or greater than K is set as the predetermined number of bits.

It is preferable for the transmission device according to the present invention to comprise a plurality of sets of a data transmission unit and a clock transmission unit. At this time, it is preferable (1) that the transmission/reception system according to the present invention comprise the transmission device according to the present invention and the reception device according to the present invention, (2) that the plurality of sets of a data transmission unit and a clock transmission unit included in the transmission device and a plurality of the reception devices correspond to each other in a one-to-one manner, (3) that each of the data reception units of the plurality of the reception devices receive data transmitted by the corresponding data transmission unit included in the transmission device, (4) that each of the clock reception units of the plurality of the reception devices receive a clock transmitted by the corresponding clock transmission unit included in the transmission device, and (5) that the reception unit of the transmission device receive calibration sample data transmitted by each of the transmission units of the plurality of the reception devices.

It is preferable for the transmission device according to the present invention to comprise a plurality of data transmission units and one clock transmission unit. At this time, it is preferable (1) that the transmission/reception system according to the present invention comprise the transmission device according to the present invention and the reception device according to the present invention, (2) that the plurality of the data transmission units included in the transmission device and the plurality of the reception devices correspond to each other in a one-to-one manner, (3) that each of the data reception units of the plurality of the reception devices receive data transmitted by the corresponding data transmission unit included in the transmission device, (4) that each of the clock reception units of the plurality of the reception devices receive a clock transmitted by the clock transmission unit of the transmission device, and (5) that the reception unit of the transmission device receive calibration sample data transmitted by each of the transmission units of the plurality of the reception devices.

In the transmission/reception system according to the present invention, it is preferable for the reception unit of the reception device to receive calibration sample data transmitted from each of the transmission units of the plurality of the reception devices via a common signal line.

The image display system according to the present invention is characterized by comprising the transmission/reception system according to the present invention and an image display unit that displays an image based on data received by each of the plurality of reception devices included in the transmission/reception system.

Advantageous Effects of Invention

According to the present invention, it is made easy to correctly sample data with a clock in a reception device.

BRIEF DESCRIPTION OF DRAWINGS

FIG. 11 is a table for explaining an operation of the control unit 15 of the transmission device 10.

FIG. 14 is a table for explaining an operation of the control unit 15 of the transmission device 10.

FIG. 17 is a table for explaining an operation of the control unit 15 of the transmission device 10.

FIG. 20 is a table for explaining an operation of the control unit 15 of the transmission device 10.

DESCRIPTION OF EMBODIMENTS

Embodiments to embody the present invention are described below in detail with reference to the attached drawings. In the description of the drawings, the same symbol is attached to the same component and duplicated description is omitted.

Figure 1:
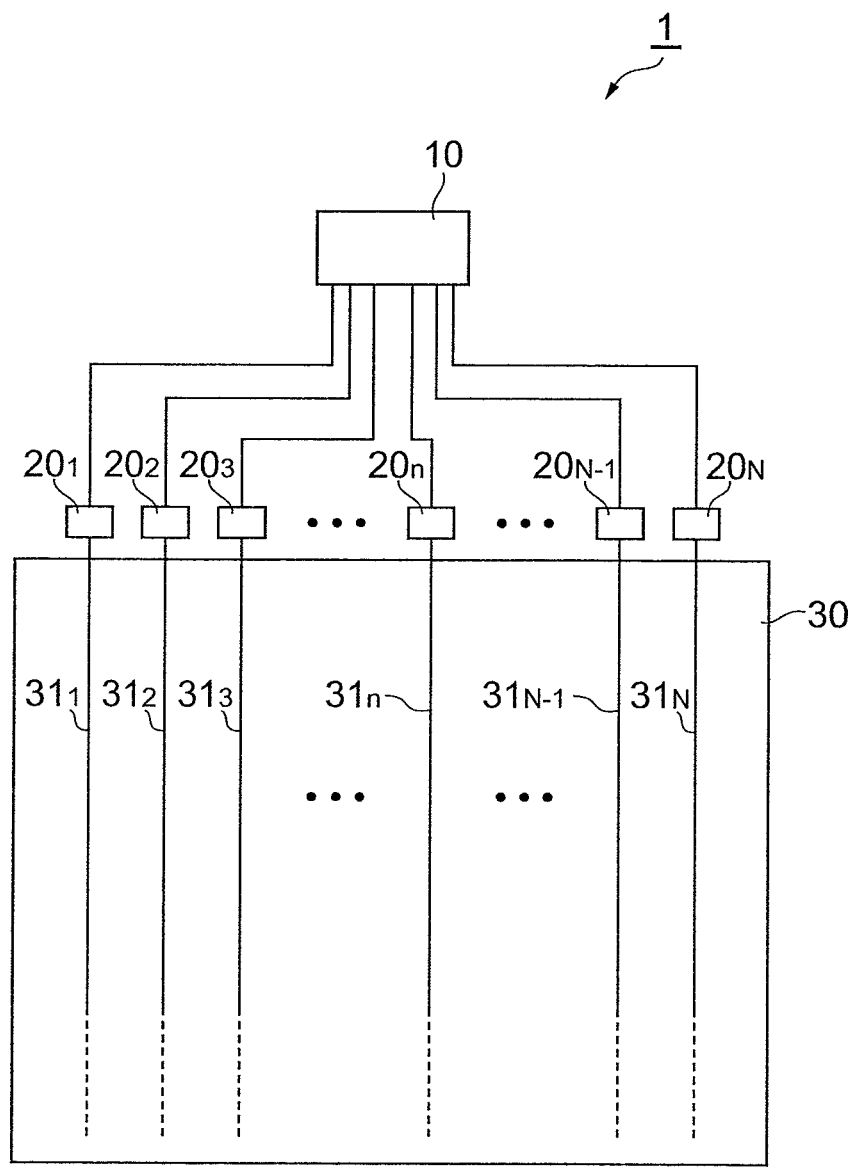
FIG. 1 is a diagram showing an outline configuration of an image display system 1.

FIG. 1 is a diagram showing an outline configuration of an image display system 1 according to an embodiment. The image display system 1 shown in FIG. 1 comprises a transmission device 10, N reception devices $20_1$ to $20_N$, and an image display unit 30. Here, N is an integer not less than 2 and n that appears below is an integer not less than 1 and not more than N. In FIG. 1, a drive unit and a signal line for a vertical scan of an image in the image display unit 30 are not shown schematically.

The transmission device 10 receives an image signal from outside and transmits image data and a clock to the N reception devices $20_1$ to $20_N$, respectively. Each reception device $20_n$ receives the image data and the clock that have been sent out from the transmission device 10 and reached, samples the image data with the clock, and sends out image data obtained by the sampling to a signal line $31_n$ of the image display unit 30. The image display unit 30 is, for example, a liquid crystal panel and displays an image based on the image data supplied from each reception device $20_n$ to the signal line $31_n$. The number of the signal lines $31_n$ may be one or more.

Figure 2:
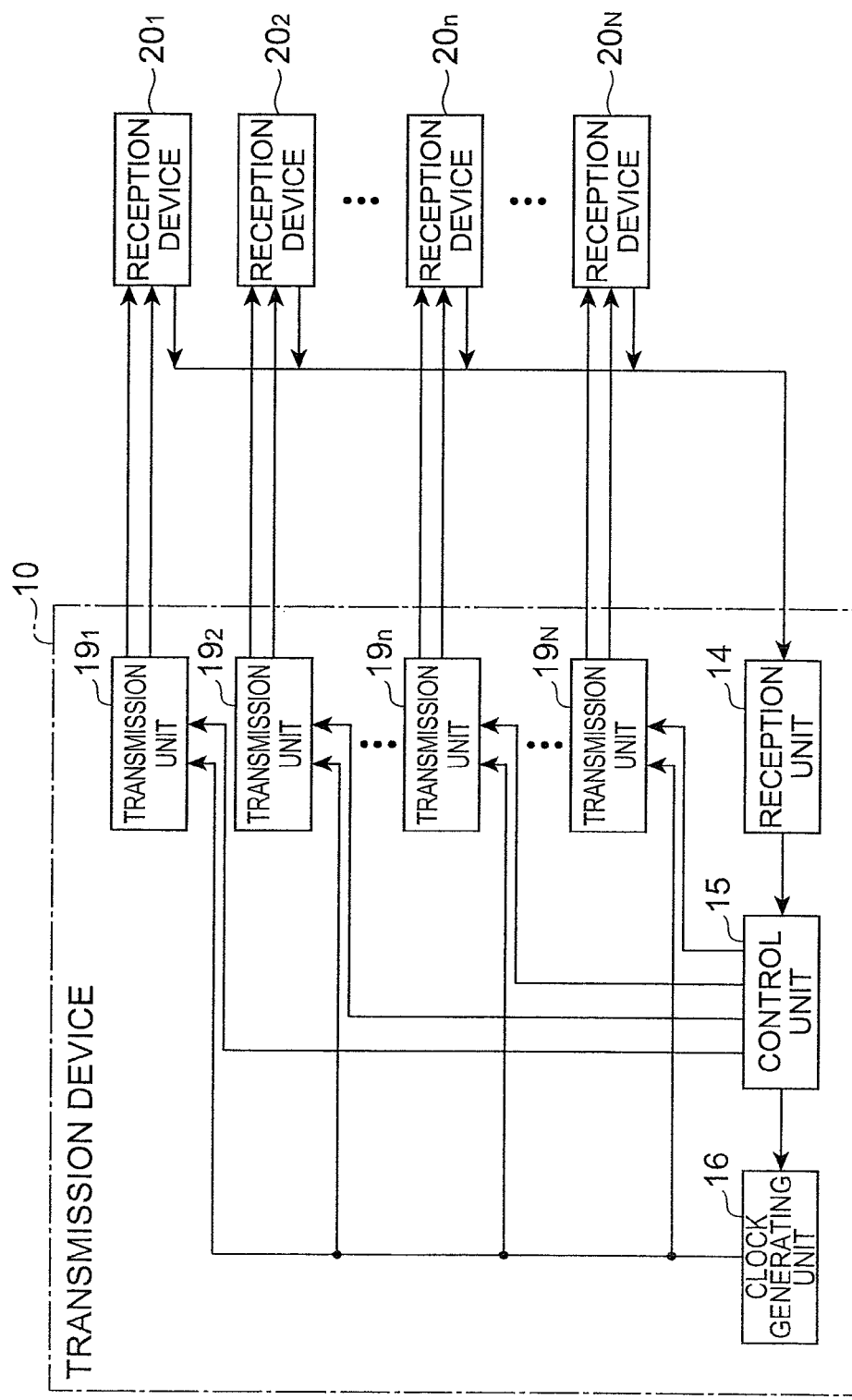
FIG. 2 is a diagram showing an outline configuration of a transmission/reception system comprising a transmission device 10 and N reception devices $20_1$ to $20_N$.

FIG. 2 is a diagram showing an outline configuration of a transmission/reception system comprising the transmission device 10 and the N reception devices $20_1$ to $20_N$ according to the present embodiment. The transmission device 10 includes a reception unit 14, a control unit 15, a clock generating unit 16, and N transmission units $19_1$ to $19_N$. Each transmission unit $19_n$ includes one set of a data transmission unit and a clock transmission unit. The N transmission units $19_1$ to $19_N$ have a common configuration. The N reception devices $20_1$ to $20_N$ have a common configuration. The transmission unit $19_n$ and the reception device $20_n$ correspond to each other in a one-to-one manner.

The transmission unit $19_n$ of the transmission device 10 transmits data and a clock to the reception device $20_n$. The reception device $20_n$ receives the data and the clock sent from the transmission unit $19_n$, samples the data with the clock, and outputs data obtained by the sampling. Further, the reception device $20_n$ sends out part of the data obtained by the sampling to the transmission device 10.

The reception unit 14 of the transmission device 10 receives data sent from each reception device $20_n$. The control unit 15 controls transmission of data and a clock by each transmission unit $19_n$. The clock generating unit 16 generates a reference clock to instruct a timing, which is a reference when each transmission unit $19_n$ of the transmission device 10 sends out data and a clock, and gives the clock to each transmission unit $19_n$.

Each signal line of data and a clock between the transmission unit $19_n$ of the transmission device 10 and the reception device $20_n$ and the signal line of data between the reception unit 14 of the transmission device 10 and the reception device $20_n$ may be one physical line or a pair of lines to transmit differential data as in the low-voltage differential signaling (LVDS) system.

Figure 3:
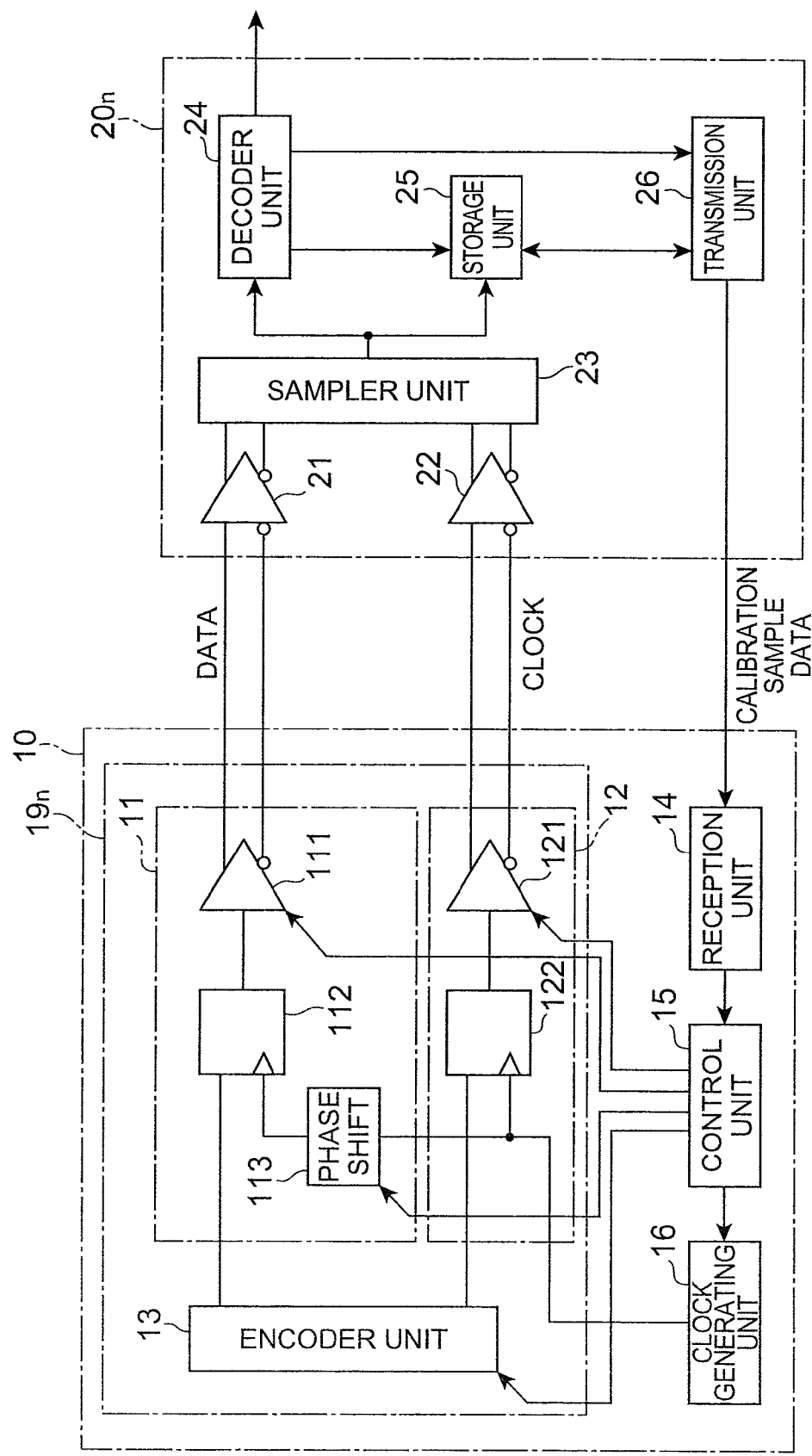
FIG. 3 is a diagram showing a configuration of the transmission device 10 and the reception device $20_n$.

FIG. 3 is a diagram showing a configuration of the transmission device 10 and the reception device $20_n$ according to the present embodiment. This diagram shows a configuration of the n-th transmission unit $19_n$ of the N transmission units $19_1$ to $19_N$ included in the transmission device 10 and a configuration of the reception device $20_n$ corresponding to the transmission unit $19_n$ in detail.

The transmission device 10 comprises the reception unit 14, the control unit 15, the clock generating unit 16, and the transmission unit $19_n$. The transmission unit $19_n$ of the transmission device 10 includes a data transmission unit 11, a clock transmission unit 12, and an encoder unit 13. The reception device $20_n$ comprises a data reception unit 21, a clock reception unit 22, a sampler unit 23, a decoder unit 24, a storage unit 25, and a transmission unit 26.

The encoder unit 13 of the transmission device 10 is controlled by the control unit 15 and gives a clock to be transmitted to the reception device $20_n$ to the clock transmission unit 12 as well as giving data to be transmitted to the reception device $20_n$ to the data transmission unit 11.

The data transmission unit 11 transmits data to the reception device $20_n$ and includes a buffer 111, a flip-flop 112, and a phase shift unit 113. The phase shift unit 113 receives a reference clock output from the clock generating unit 16, changes the phase of the reference clock by an amount of phase shift instructed by the control unit 15, and outputs it to the flip-flop 112. The flip-flop 112 latches data output from the encoder unit 13 at the timing instructed by the clock output from the phase shift unit 113 and outputs the latched data to the buffer 111. The buffer 111 makes an adjustment of amplitude and offset instructed by the control unit 15 for the data output from the flip-flop 112 and transmits the adjusted data to the reception device $20_n$.

The clock transmission unit 12 transmits a clock to the reception device $20_n$ and includes a buffer 121 and a flip-flop 122. The flip-flop 122 latches a clock output from the encoder unit 13 at the timing instructed by the reference clock output from the clock generating unit 16 and outputs the latched data to the buffer 121. The buffer 121 makes an adjustment of offset instructed by the control unit 15 for the data output from the flip-flop 112 and transmits the adjusted data to the reception device $20_n$ as a clock.

The reception unit 14 receives data sent from the transmission unit 26 of the reception device $20_n$. The control unit 15 controls data transmission by the data transmission unit 11 and clock transmission by the clock transmission unit 12. Specifically, the control unit 15 controls data to be given from the encoder unit 13 to the data transmission unit 11. The control unit 15 adjusts the phase between the data transmitted by the data transmission unit 11 and the clock transmitted by the clock transmission unit 12 by controlling the amount of phase shift of the reference clock in the phase shift unit 113 of the data transmission unit 11 based on the data received by the reception unit 14. Further, the control unit 15 adjusts the amplitude and duty of the data transmitted from the buffer 111 of the data transmission unit 11 based on the data received by the reception unit 14 and adjusts the duty of the clock transmitted from the buffer 121 of the clock transmission unit 12.

It is preferable for the control unit 14 to control all of the phase between data and a clock, the amplitude and duty of data, and the duty of clock, however, it may also be possible to cause the control unit 15 to control any one or more of these.

The data output from the data transmission unit 11 when the encoder unit 13 is controlled by the control unit 14 is classified into four kinds of data, that is, normal data used to display an image in the image display unit 30, calibration data to detect a data reception state in the data reception unit 21 of the reception device $20_n$ or a clock reception state in the clock reception unit 22 of the reception device $20_n$, calibration start instruction data to instruct the start of transmission/reception of the calibration data, and transmission instruction data to instruct the transmission unit 25 of the reception device $20_n$ to send out calibration sample data that the sample unit 23 of the reception device $20_n$ obtained by sampling the calibration data.

The data reception unit 21 of the reception device $20_n$ receives data sent out from the data transmission unit 11 of the transmission device 10. The clock reception unit 22 of the reception device $20_n$ receives a clock sent out from the clock transmission unit 12 of the transmission device 10. The data received by the clock reception unit 22 is classified into the four kinds of data, that is, the normal data, calibration data, calibration start instruction data, and transmission instruction data described above.

The sampler unit 23 samples the data received by the data reception unit 21 with the clock received by the clock reception unit 22 and outputs data obtained by the sampling to the decoder unit 24 and the storage unit 25. The sampler unit 23 may sample data at the timings of both rise and fall of the clock or may sample data at the timing of one of rise and fall of the clock.

The decoder unit 24 identifies the kind of data by decoding the data output from the sampler unit 23 and sends out the data to the signal line $31_n$ when the data is the normal data used to display an image in the image display unit 30. Further, when the data output from the sampler unit 23 is calibration start instruction data, the decoder unit 24 causes the storage unit 25 to store calibration sample data that the sampler unit 23 obtained afterward by sampling calibration data and furthermore, when the data output afterward from the sampler unit 23 is transmission instruction data, the decoder unit 24 causes the transmission unit 26 to send out the calibration sample data stored by the storage unit 25.

When the data output from the sampler unit 23 is calibration start instruction data, the storage unit 25 stores calibration sample data that the sampler unit 23 obtained afterward by sampling calibration data by the instruction of the decoder unit 24. At this time, the storage unit 25 may store all the data that the sampler unit 23 obtained by sampling the calibration data as calibration sample data, or may store data at intervals corresponding to a predetermined number of bits of the data that the sampler unit 23 obtained by sampling the calibration data as calibration sample data.

When the data output from the sampler unit 23 is transmission instruction data, the transmission unit 26 reads the calibration sample data stored by the storage unit 25 by the instruction of the decoder unit 24 and transmits the calibration sample data to the reception unit 14 of the transmission device 10.

Next, using FIG. 4 to FIG. 8, transmission of various kinds of data from the transmission device 10 to the reception device $20_n$ and transmission of calibration sample data from the reception device $20_n$ to the transmission device 10 are explained. In the following, it is assumed that each clock transmission unit 12 of the N transmission units $19_1$ to $19_N$ included in the transmission device 10 transmits a clock at the same timing. It is also assumed that the normal data transmitted from the transmission device 10 to the reception device $20_n$ is transmitted as a packet encoded with the 8b10b code. In the data encoded with the 8b10b code having a fixed length of 10 bits, there is a case where the same code continues in successive five bits or less, however, the same code never continues in successive six bits or more. Further, it is assumed that the sampler unit 23 of the reception device $20_n$ samples data at timings of both rise and fall of the clock.

Figure 4:
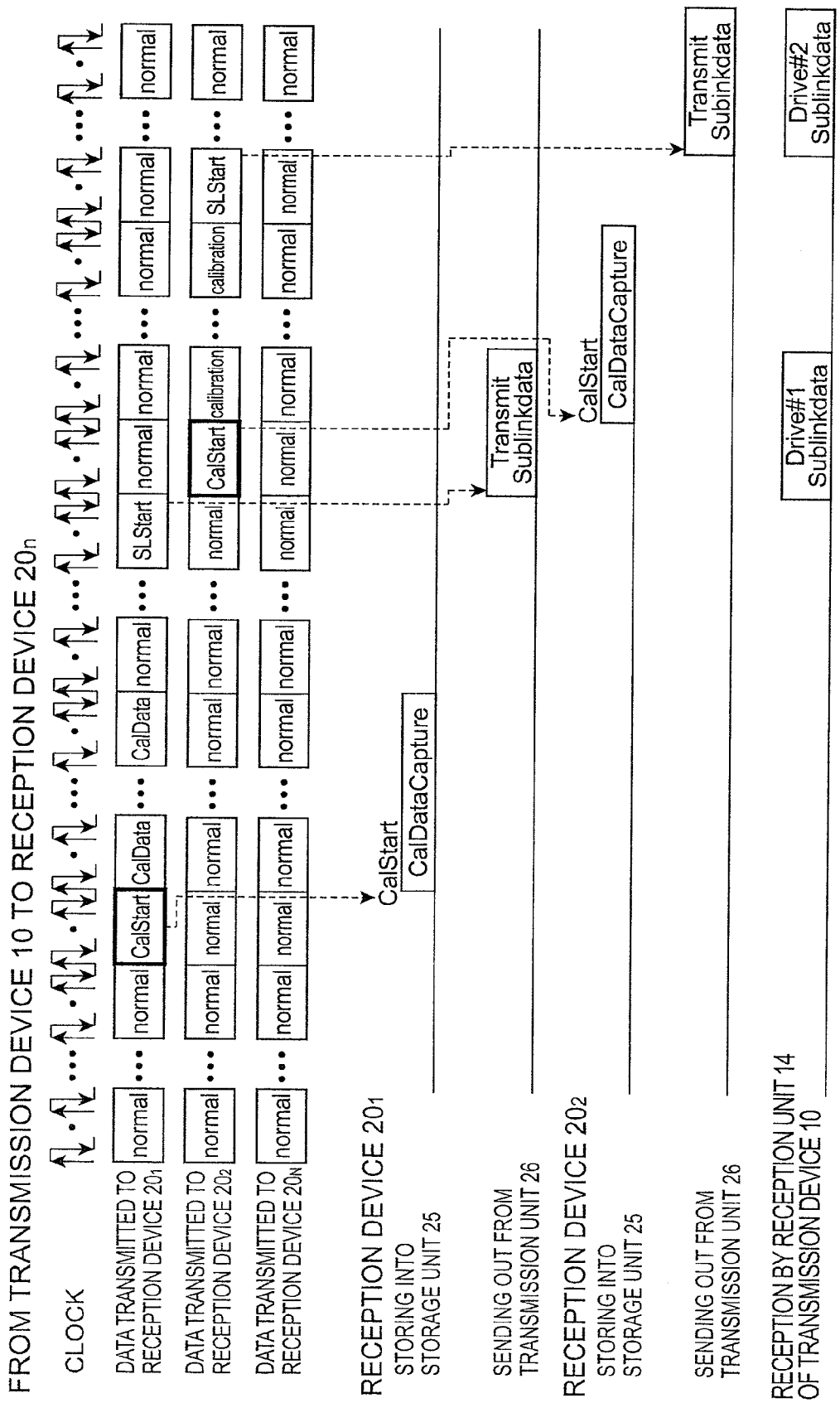
FIG. 4 is a diagram showing an outline of a timing of data transmission/reception between the transmission device 10 and the reception device $20_n$.

FIG. 4 is a diagram showing an outline of the timing of data transmission/reception between the transmission device 10 and the reception device $20_n$ in the present embodiment. In this diagram, the timings of the transmission of the clock and data from the transmission device 10 to the reception device $20_n$, the storage of the calibration sample data by the storage unit 25 in the reception device $20_n$ and the transmission of the calibration sample data by the transmission unit 26, and the reception of the calibration sample data by the reception unit 14 of the transmission device 10 are shown in this order from the top.

The data transmission unit 11 included in the transmission unit $19_n$ of the transmission device 10 transmits the normal data (represented as "normal" in the diagram) used to display an image in the image display unit 30, the calibration data (represented as "CalData" in the diagram) to detect the data reception state in the data reception unit 21 of the reception device $20_n$ or the clock reception state in the clock reception unit 22 of the reception device $20_n$, the calibration start instruction data (represented as "CalStart" in the diagram) to instruct the start of the transmission/reception of the calibration data, and the transmission instruction data (represented as "SLStart" in the diagram) to instruct the transmission unit 25 of the reception device $20_n$ to send out the calibration sample data that the sampler unit 23 of the reception device $20_n$ obtained by sampling the calibration data to the reception device $20_n$ at predetermined timings.

The transmission device 10 sequentially transmits the calibration start instruction data (CalStart), the calibration data (CalData), and the transmission instruction data (SLStart) to the reception device $20_n$ during a period (for example, the blanking period) different from the period during which the normal data (normal) is transmitted. The transmission device 10 transmits the data to the reception device $20_n$ by the packet system.

In the reception device $20_n$, when the received data is determined to be the calibration start instruction data (CalStart) by the decoder unit 24, data that the sampler unit 23 obtained by sampling the calibration data (CalData) received afterward at a predetermined timing is stored by the storage unit 25 as the calibration sample data (represented as "CalDataCapture" in the diagram). Further, after that, in the reception device $20_n$, when the received data is determined to be the transmission instruction data (SLStart) by the decoder unit 24, the calibration sample data stored by the storage unit 25 is sent out from the transmission unit 26 (represented as "Transmit Sub link data" in the diagram.)

The transmission/reception as described above are performed sequentially for the N reception units $20_1$ to $20_N$. The reception unit 26 of the transmission device 10 sequentially receives the calibration sample data transmitted from each of the transmission units 26 of the N reception units $20_1$ to $20_N$ (represented as "Driver#n Sub link data" in the diagram.)

Figure 5:
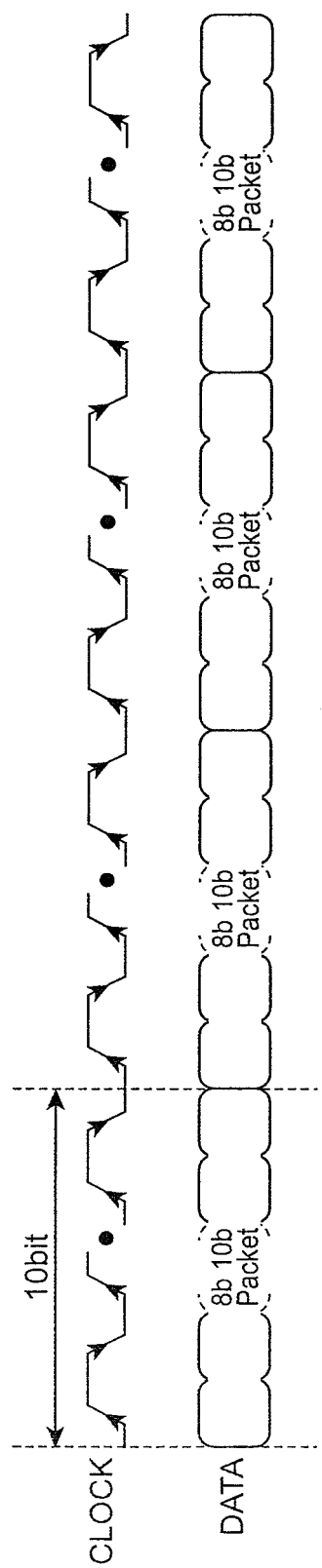
FIG. 5 is a diagram showing a timing of normal data sent out from the transmission device 10 and received by the reception device $20_n$.

FIG. 5 is a diagram showing the timing of the normal data sent out from the transmission device 10 and received by the reception device $20_n$ in the present embodiment. The normal data received by the reception device $20_n$ is received as a packet encoded with the 8b10b code. When the phase between data and a clock at the time of sending out in the transmission device 10 is adjusted appropriately by the control unit 15, in the normal data received by the reception device $20_n$, the timings (rise and fall of the clock) of data sampling instructed by the clock are located at the center of each bit.

Figure 6:
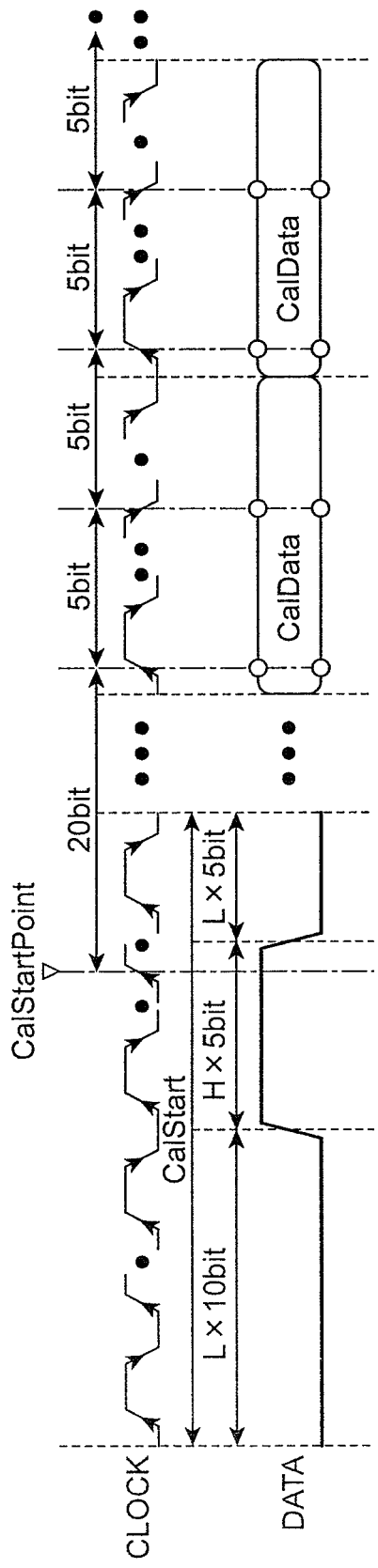
FIG. 6 is a diagram showing a timing of calibration start instruction data and calibration data sent out from the transmission device 10 and received by the reception device $20_n$.

FIG. 6 is a diagram showing the timing of the calibration start instruction data and the calibration data sent out from the transmission device 10 and received by the reception device $20_n$ in the present embodiment. As described above, the normal data is encoded with the 8b10b code and the same code never continues in the successive 6 bits or more. Because of this, the calibration start instruction data is deemed to be data that never appears with the 8b10b code in order to distinguish the calibration start instruction data from the normal data. The calibration start instruction data (CalStart) is configured as data of 20 bits in total, for example, as shown schematically, in which the L level continues in successive 10 bits and following this, the H level continues in successive five bits, and further following this, the L level continues in successive five bits.

The data transmission unit 11 of the transmission device 10 transmits such calibration start instruction data (CalStart) to the reception device $20_n$. The decoder unit 24 of the reception device $20_n$ recognizes that the calibration start instruction data is received (represented as "CalStartPoint" in the diagram) when, for example, the received data turns from the H level to the L level for the first time after the L level continues during a period of successive seven bits or more in the received data.

The data transmission unit 11 of the transmission device 10 transmits the calibration data (CalData) to the reception device $20_n$ after transmitting the calibration start instruction data. The decoder unit 24 of the reception device $20_n$ causes the storage unit 25 to store, as calibration sample data, the calibration data (CalData) sampled by the sampler unit 23 for every five bits after the 20 bits when recognizing the reception of the calibration start instruction data (CalStartPoint). Here, by taking the calibration data (CalData) sampled by the sampler unit 23 for every odd-number bits, such as for every five bits, as calibration sample data, the calibration sample data will be data obtained by sampling the calibration data at both rise and fall of the clock, respectively.

Figure 7:
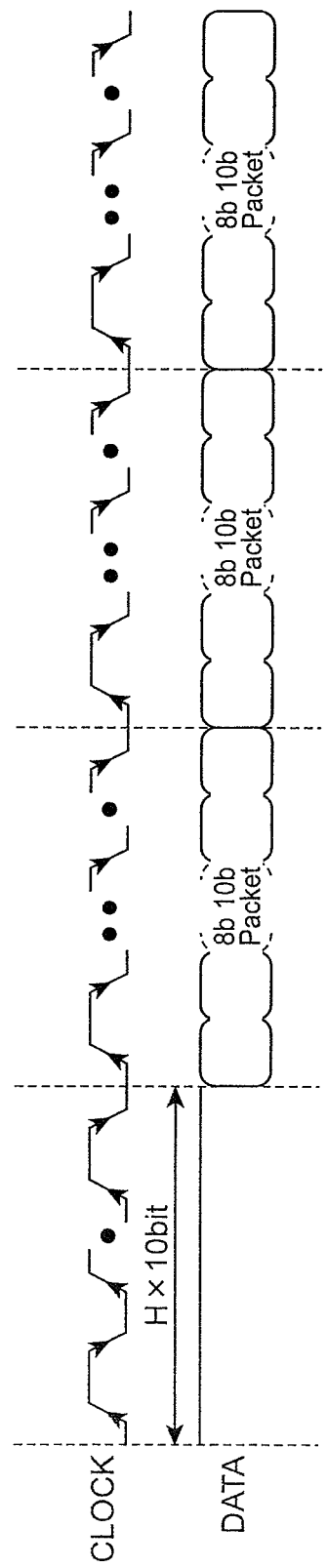
FIG. 7 is a diagram showing a timing of transmission instruction data and normal data sent out from the transmission device 10 and received by the reception device $20_n$.

FIG. 7 is a diagram showing the timing of the transmission instruction data and the normal data sent out from the transmission device 10 and received by the reception device $20_n$ in the present embodiment. The transmission instruction data is also taken as data that never appears with the 8b10b code in order to distinguish it from the normal data. The transmission instruction data (SLStart) is configured as, for example, data in which the H level continues in 10 bits as shown schematically.

The data transmission unit 11 of the transmission device 10 transmits the transmission instruction data to the reception device $20_n$ after transmitting calibration data and then further transmits the normal data to the reception device $20_n$. The decoder unit 24 of the reception device $20_n$ recognizes the received data in which the H level continues in 10 bits as the transmission instruction data and causes the transmission unit 26 to send out the calibration sample data stored by the storage unit 25. Further, the decoder unit 24 of the reception device $20_n$ recognizes the received data after receiving the transmission instruction data as the normal data.

Figure 8:
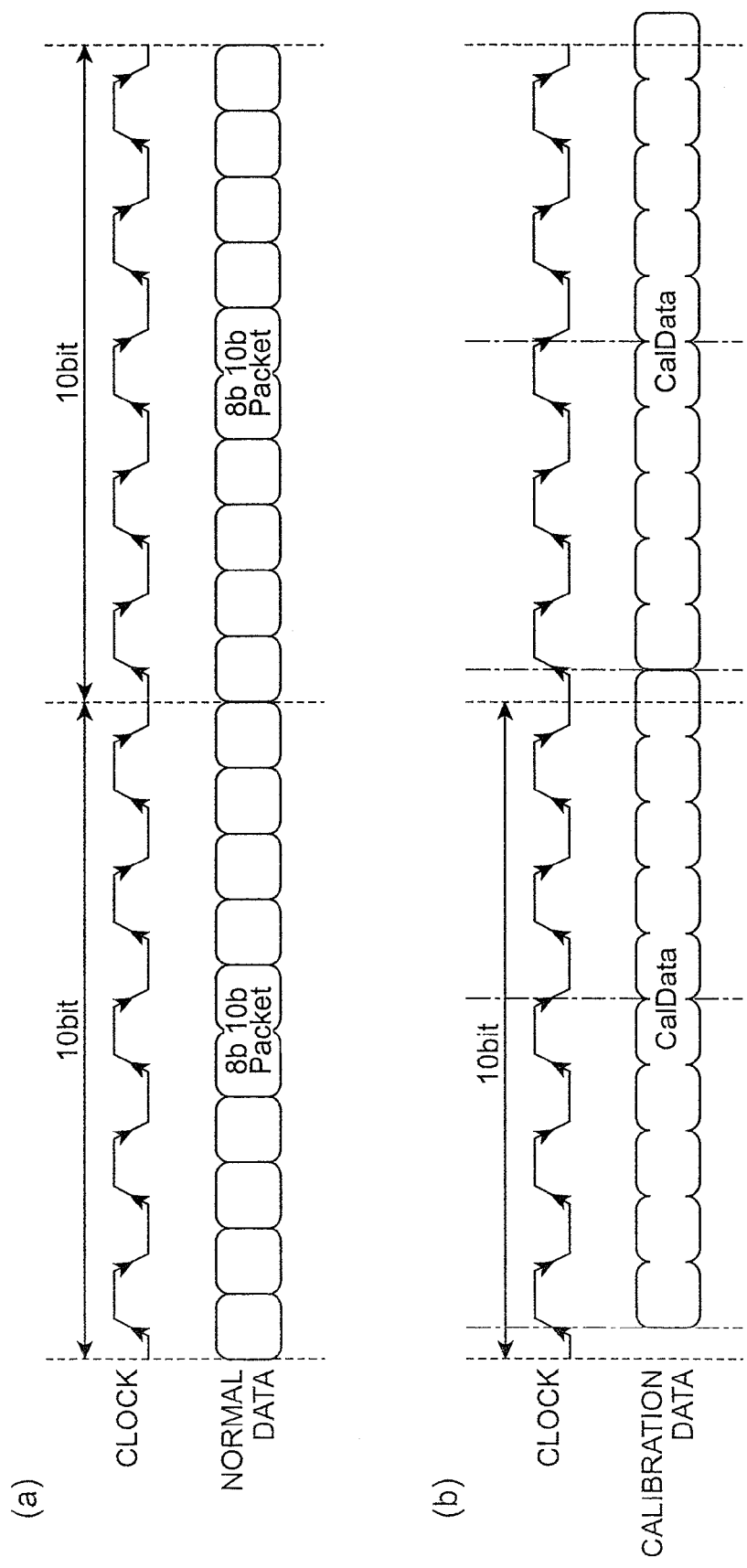
FIG. 8 is a diagram showing a timing of normal data and a timing of calibration data, respectively, sent out from the transmission device 10 and received by the reception device $20_n$ by comparison.

FIG. 8 shows the timings of the normal data and the calibration data, respectively, sent out from the transmission device 10 and received by the reception device $20_n$ in the present embodiment by comparison. FIG. 8-(a) shows the timing of the normal data and FIG. 8-(b) shows the timing of the calibration data.

When the phase between data and a clock at the time of sending out in the transmission device 10 is adjusted appropriately by the control unit 15, in the normal data received by the reception device $20_n$, as shown in FIG. 8-(a), the timing (rise and fall of the clock) of the data sampling instructed by the clock is located at the center of each bit. This is the same in the calibration start instruction data and the transmission instruction data as in the normal data.

In contrast to this, as shown in FIG. 8-(b), in the calibration data received by the reception device $20_n$, the timing (rise and fall of the clock) of the data sampling instructed by the clock is located at the inter-bit transition.

That is, in the transmission device 10, the control unit 15 causes the data transmission unit 11 to transmit calibration data in which an inter-bit transition exists in a position shifted relatively by an amount corresponding to 0.5 bits when causing the data transmission unit 11 to transmit calibration data compared to when causing the data transmission unit 11 to transmit normal data and transmission instruction data, respectively. Alternatively, the control unit 15 causes the clock transmission unit 12 to shift the clock by an amount corresponding to 0.5 bits when causing the data transmission unit 11 to transmit calibration data compared to when causing the data transmission unit 11 to transmit normal data, calibration start instruction data, and transmission instruction data, respectively. By providing shifts by amounts corresponding to 0.25 bits, 0.75 bits, etc., other than 0.5 bits, it is possible to make a phase adjustment more quickly.

Figure 9:
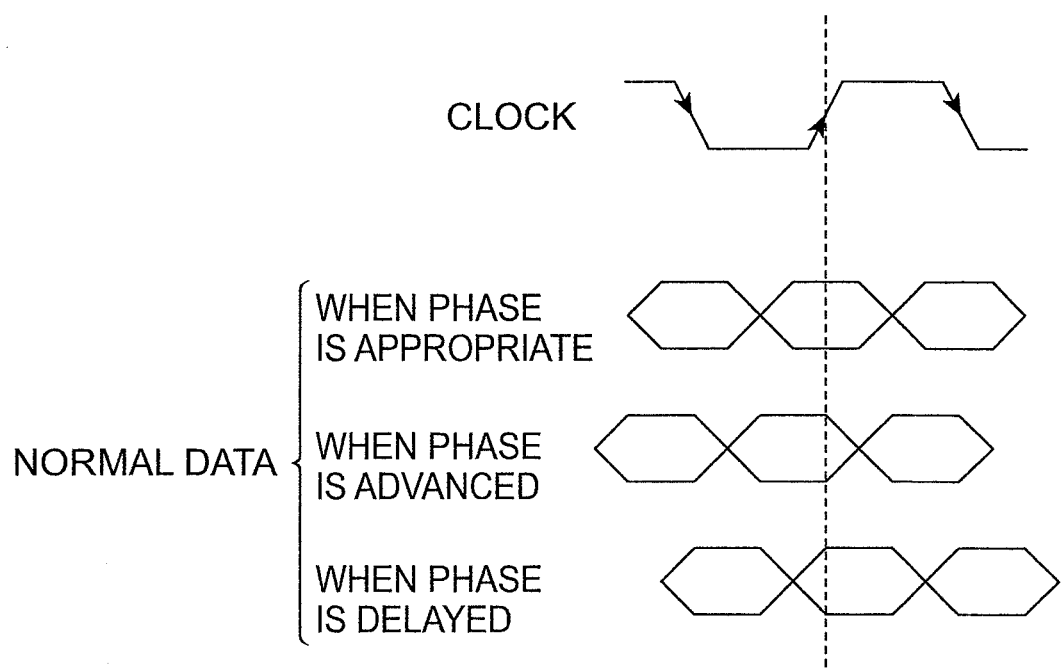
FIG. 9 is a diagram showing a relationship of phase between a clock and normal data received by the reception device $20_n$.
Figure 10:
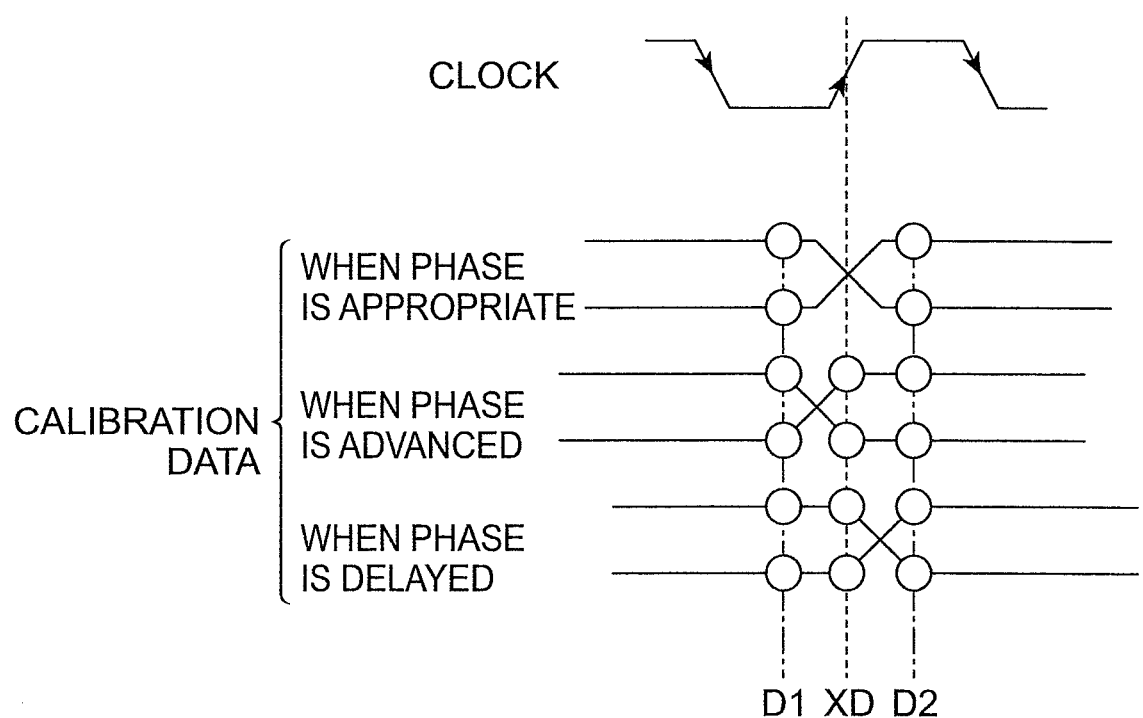
FIG. 10 is a diagram for explaining data used by a control unit 15 of the transmission device 10.
Figure 12:
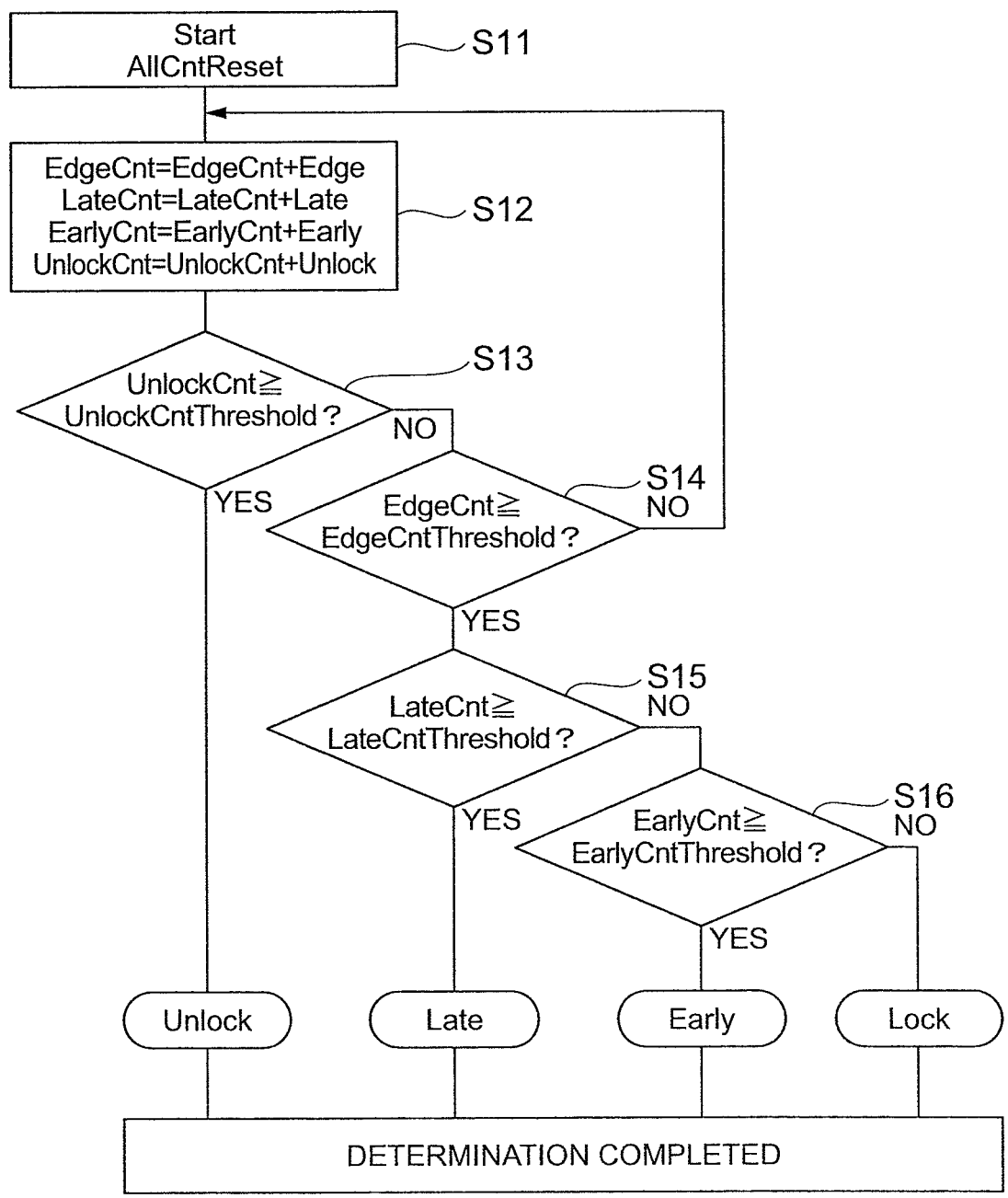
FIG. 12 is a flowchart for explaining an operation of the control unit 15 of the transmission device 10.

Next, using FIG. 9 to FIG. 12, a method of determining a phase between data and a clock at the time of reception by the reception device $20_n$ by the control unit 15 of the transmission device 10 having received calibration sample data from the reception device $20_n$ is explained. FIG. 9 is a diagram showing a relationship of phase between a clock and normal data received by the reception device $20_n$. FIG. 10 is a diagram for explaining data used by the control unit 15 of the transmission device 10. FIG. 11 is a table for explaining an operation of the control unit 15 of the transmission device 10. FIG. 12 is a flowchart for explaining an operation of the control unit 15 of the transmission device 10.

In correspondence with the relationship of phase between a clock and normal data received by the reception device $20_n$ shown in FIG. 9, the relationship of phase between a clock and calibration data received by the reception device $20_n$ will be as shown in FIG. 10. As shown in FIG. 10, the control unit 15 of the transmission device 10 uses calibration sample data XD, which is sent from the reception device $20_n$, of the calibration data sampled by the sampler unit 23 of the reception device $20_n$, calibration data D1 of the bit immediately before the sampling of the calibration sample data XD, and calibration data D2 of the bit immediately after the sampling of the calibration sample data XD. The calibration data D1, D2 are data transmitted by the transmission device 10 itself.

As shown in FIG. 11, the control unit 15 detects whether or not there is data transition between the two bits before and after the sampling of the calibration sample data XD (Edge), whether or not the phase of the data is advanced with respect to the clock at the time of reception by the reception device $20_n$ (Early), whether or not the phase of the data is delayed with respect to the clock at the time of reception by the reception device $20_n$ (Late), and whether or not the frequency of the clock and the bit rate of the data are in the unlocked state at the time of reception by the reception device $20_n$ (Unlock) based on the three pieces of the data D1, XD and D2.

That is, the control unit 15 sets the value of variable Edge to 1 when there is data transition between the two bits D1, D2, or sets the value of variable Edge to 0 when not. The control unit 15 sets the value of variable Early to 1 when the phase of the data is advanced with respect to the clock at the time of reception by the reception device $20_n$, or sets the value of variable Early to 0 when not. The control unit 15 sets the value of variable Late to 1 when the phase of the data is delayed with respect to the clock at the time of reception by the reception device $20_n$, or sets the value of variable Late to 0 when not. Further, the control unit 15 sets the value of variable Unlock to 1 when the state is the unlocked state, or sets the value of variable Unlock to 0 when not.

Then, the control unit 15 detects a phase difference between the data received by the data reception unit 21 of the reception device $20_n$ and the clock received by the clock reception unit 22 of the reception device $20_n$ based on each value of variables Edge, Early, Late, and Unlock. Specifically, as shown in FIG. 12, the control unit 15 performs the following processing using variables EdgeCnt, EarlyCnt, LateCnt, and UnlockCnt, and constants EdgeCntThreshold, EarlyCntThreshold, LateCntThreshold, and UnlockCntThreshold.

In the control unit 15, at first, in step S11, the values of variables EdgeCnt, EarlyCnt, LateCnt, and UnlockCnt are initialized, respectively, and after that, in step S12, the value of variable Edge is added cumulatively to variable EdgeCnt, the value of variable Early is added cumulatively to variable EarlyCnt, the value of variable Late is added cumulatively to variable LateCnt, and the value of variable Unlock is added cumulatively to variable UnlockCnt for each of the calibration sample data XD.

In step S13, whether or not the value of variable UnlockCnt is equal to or greater than constant UnlockCntThreshold is determined and when the former is equal to or greater than the latter, it is determined that the clock frequency and the bit rate of the data are in the unlocked state (Unlock).

When the value of variable UnlockCnt is determined to be less than constant UnlockCntThreshold in step S13, whether or not the value of variable EdgeCnt is equal to or greater than constant EdgeCntThreshold is determined in step S14. When the value of variable EdgeCnt is determined to be less than constant EdgeCntThreshold in step S14, the process returns to step S12.

When the value of variable EdgeCnt is determined to be equal to or greater than constant EdgeCntThreshold in step S14, whether or not the value of variable LateCnt is equal to or greater than constant LateCntThreshold is determined in step S15 and when the former is equal to or greater than the latter, it is determined that the phase of the data is delayed at the time of reception by the reception device $20_n$ (Late). Further, in step S16, whether or not the value of variable EarlyCnt is equal to or greater than constant EarlyCntThreshold is determined and when the former is equal to or greater than the latter, it is determined that the phase of the data is advanced at the time of reception by the reception device $20_n$ (Early). When neither is the case, it is determined that the phase difference is within an allowable range at the time of reception by the reception device $20_n$ (Lock).

Figure 13:
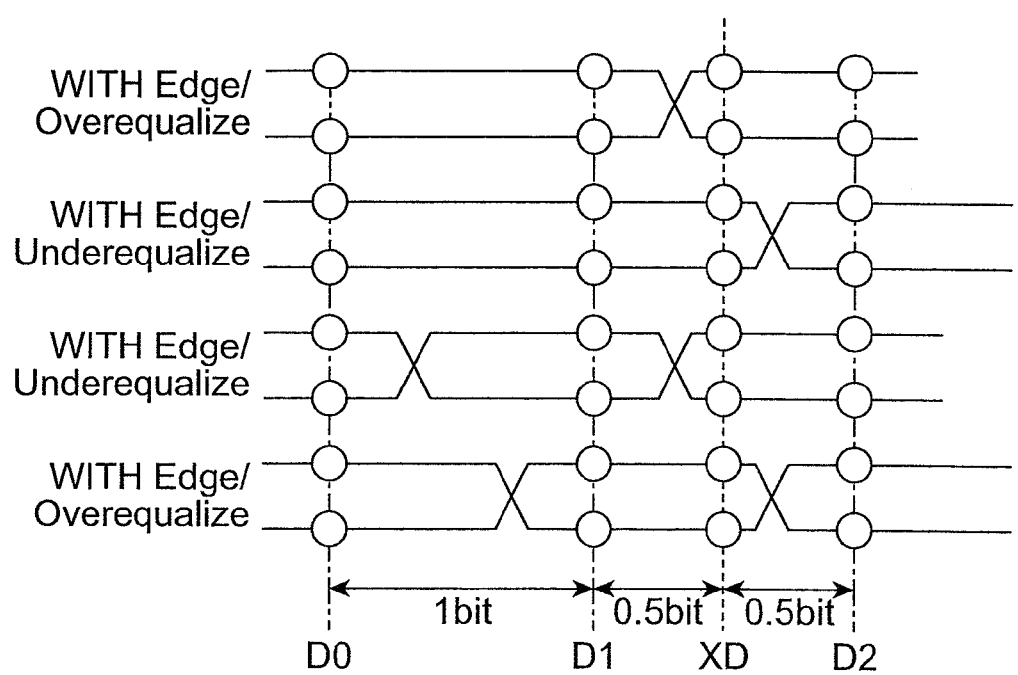
FIG. 13 is a diagram for explaining data used by the control unit 15 of the transmission device 10.
Figure 15:
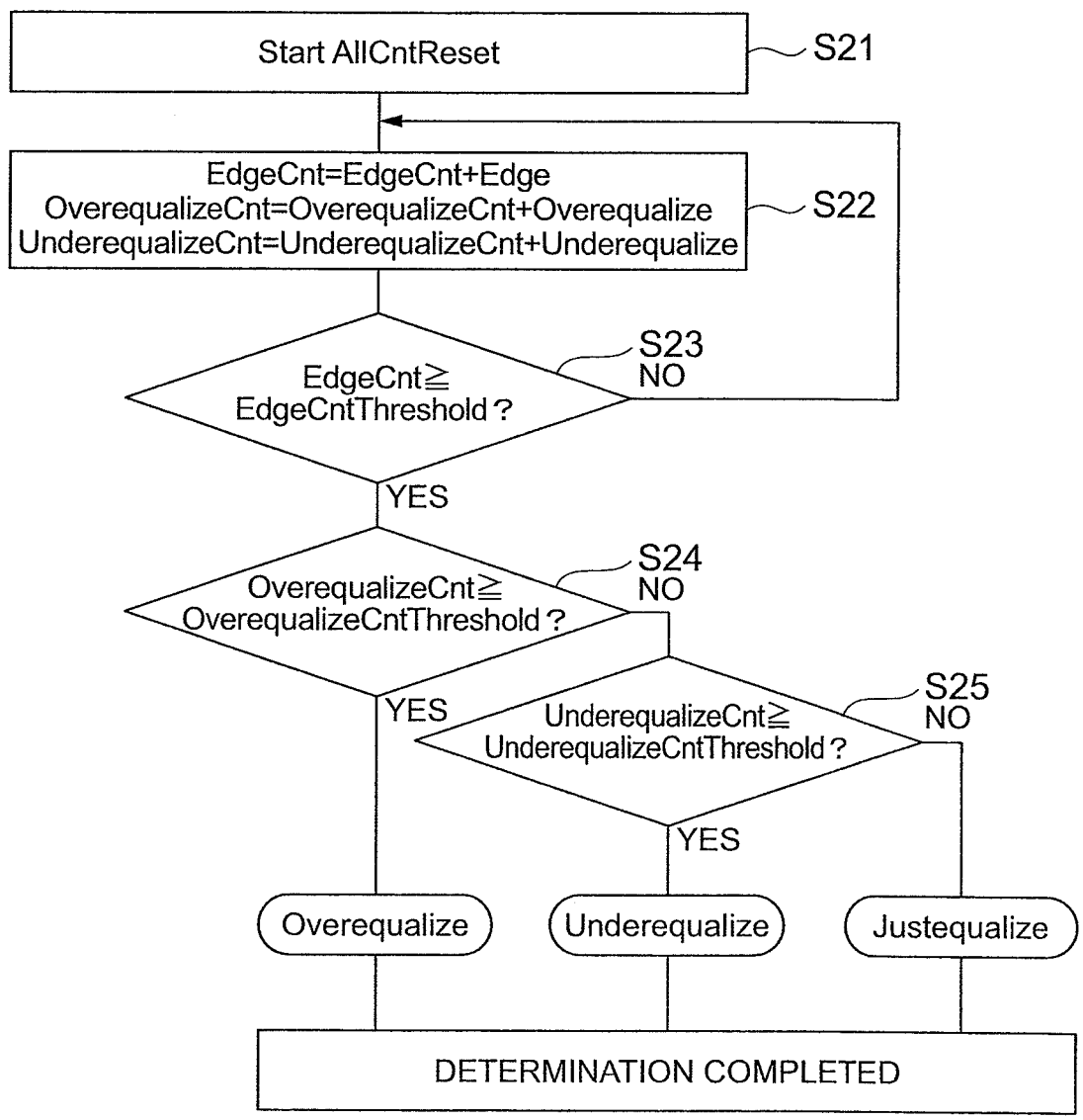
FIG. 15 is a flowchart for explaining an operation of the control unit 15 of the transmission device 10.

Next, using FIG. 13 to FIG. 15, a method of determining the amplitude of the data at the time of reception by the reception device $20_n$ by the control unit 15 of the transmission device 10 having received calibration sample data from the reception device $20_n$ is explained. FIG. 13 is a diagram for explaining data used by the control unit 15 of the transmission device 10. FIG. 14 is a table for explaining an operation of the control unit 15 of the transmission device 10. FIG. 15 is a flowchart for explaining an operation of the control unit 15 of the transmission device 10.

As shown in FIG. 13, the control unit 15 of the transmission device 10 uses the calibration sample data XD, which is sent from the reception device $20_n$, of the calibration data sampled by the sampler unit 23 of the reception device $20_n$, the calibration data D1 of the bit immediately before the sampling of the calibration sample data XD, calibration data D0 of the bit immediately before the calibration data D1, and the calibration data D2 of the bit immediately after the sampling of the calibration sample data XD. The calibration data D0, D1 and D2 are data transmitted by the transmission device 10 itself.

As shown in FIG. 14, the control unit 15 detects whether or not there is data transition between the two bits D1, D2 (Edge), whether or not the waveform distortion of the data is large because the amplitude of the high-frequency component is small at the time of reception by the reception device $20_n$ (Underequalize), whether or not the waveform distortion of the data is large because the amplitude of the high-frequency component of the data is large at the time of reception by the reception device $20_n$ (Overequalize), and whether or not the frequency of the clock and the bit rate of the data are in the unlocked state at the time of reception by the reception device $20_n$ (Unlock) for each of the calibration sample data XD based on the four pieces of the data D0, D1, XD and D2.

That is, the control unit 15 sets the value of variable Edge to 1 when there is data transition between the two bits D1, D2 or sets the value of variable Edge to 0 when not. The control unit 15 sets the value of variable Underequalize to 1 when the waveform distortion of the data is large because the amplitude of the high-frequency component of the data is small at the time of reception by the reception device $20_n$ or sets the value of variable Underequalize to 0 when not. The control unit 15 sets the value of variable Overequalize to 1 when the waveform distortion is large because the amplitude of the high-frequency component of the data is large at the time of reception by the reception device $20_n$ or sets the value of variable Overequalize to 0 when not. Further, the control unit 15 sets the value of variable Unlock to 1 when the state is the unlocked state or sets the value of variable Unlock to 0 when not.

Then, the control unit 15 detects the waveform distortion of the data received by the data reception unit 21 of the reception device $20_n$ based on each value of variables Edge, Underequalize, Overequalize, and Unlock. Specifically, as shown in FIG. 15, the control unit 15 performs the following processing using variables EdgeCnt, OverequalizeCnt, and UnderequalizeCnt, and constants EdgeCntThreshold, OverequalizeCntThreshold, and UnderCntThreshold.

In the control unit 15, at first, in step S21, the values of variables EdgeCnt, OverequalizeCnt, and UnderequalizeCnt are initialized, respectively, and after that, in step S22, the value of variable Edge is added cumulatively to variable EdgeCnt, the value of Overequalize is added cumulatively to variable OverequalizeCnt, and the value of variable Underequalize is added cumulatively to variable UnderequalizeCnt for each of the calibration sample data XD.

In step S23, whether or not the value of variable EdgeCnt is equal to or greater than constant EdgeCntThreshold is determined. When it is determined that the value of variable EdgeCnt is less than constant EdgeCntThreshold in step S23, the process returns to step S22.

When it is determined that the value of variable EdgeCnt is equal to or greater than constant EdgeCntThreshold in step S23, whether or not the value of variable OverequalizeCnt is equal to or greater than constant OverequalizeCntThreshold is determined in step S24 and when the former is equal to or greater than the latter, it is determined that the waveform distortion is large because the amplitude of the high-frequency component of the data received by the reception device $20_n$ is large (Overequalize). In step S25, whether or not the value of variable UnderequalizeCnt is equal to or greater than constant UnderequalizeCntThreshold is determined and when the former is equal to or greater than the latter, it is determined that the waveform distortion is large because the amplitude of the high-frequency component of the data received by the reception device $20_n$ is small (Underequalize). When neither is the case, it is determined that the amplitude of the high-frequency component of the data received by the reception device $20_n$ is within an allowable range (Justequalize).

Figure 16:
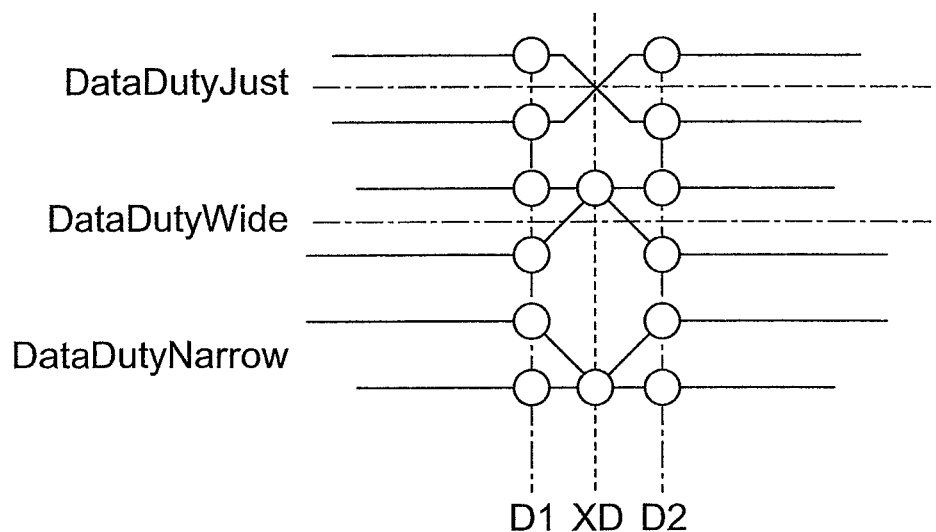
FIG. 16 is a diagram for explaining data used by the control unit 15 of the transmission device 10.
Figure 18:
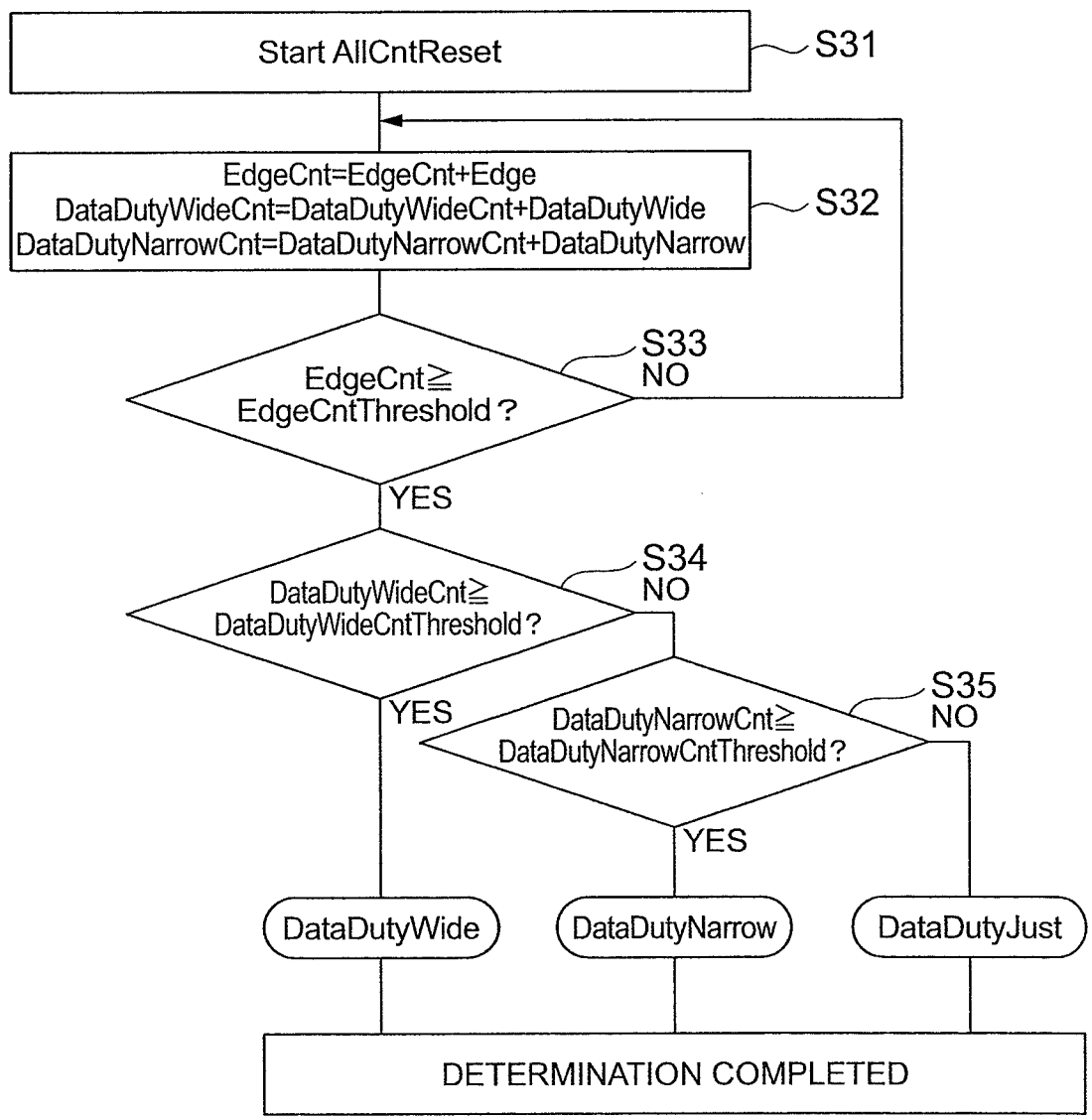
FIG. 18 is a flowchart for explaining an operation of the control unit 15 of the transmission device 10.

Next, using FIG. 16 to FIG. 18, a method of determining the duty of the data at the time of reception by the reception device $20_n$ by the control unit 15 of the transmission device 10 having received calibration sample data from the reception device $20_n$ is explained. FIG. 16 is a diagram for explaining data used by the control unit 15 of the transmission device 10. FIG. 17 is a table for explaining an operation of the control unit 15 of the transmission device 10. FIG. 18 is a flowchart for explaining an operation of the control unit 15 of the transmission device 10.

As shown in FIG. 16, the control unit 15 of the transmission device 10 uses the calibration sample data XD, which is sent from the reception device $20_n$, of the calibration data sampled by the sampler unit 23 of the reception device $20_n$, the calibration data D1 of the bit immediately before the sampling of the calibration sample data XD, and the calibration data D2 of the bit immediately after the sampling of the calibration sample data XD. The calibration data D1, D2 are data transmitted by the transmission device 10 itself.

As shown in FIG. 17, the control unit 15 detects whether or not there is data transition between the two bits before and after the sampling of the calibration sample data XD (Edge), whether or not the duty of the data is wide at the time of reception by the reception device $20_n$ (DataDutyWide), and whether or not the duty of the data is narrow at the time of reception by the reception device $20_n$ (DataDutyNarrow) based on the three pieces of the data D1, XD and D2.

That is, the control unit 15 sets the value of variable Edge to 1 when there is data transition between the two bits D1, D2 or sets the value of variable Edge to 0 when not. The control unit 15 sets the value of variable DataDutyWide to 1 when the duty of the data is wide at the time of reception by the reception device $20_n$ or sets the value of variable DataDutyWide to 0 when not. Further, the control unit 15 sets the value of variable DataDutyNarrow to 1 when the duty of the data is narrow at the time of reception by the reception device $20_n$ or sets the value of variable DataDutyNarrow to 0 when not.

Then, the control unit 15 detects whether the duty of the data received by the data reception unit 21 of the reception device $20_n$ is wide or narrow based on each value of these variables Edge, DataDutyWide, and DataDutyNarrow. Specifically, as shown in FIG. 18, the control unit 15 performs the following processing using variables EdgeCnt, DataDutyWideCnt, and DataDutyNarrowCnt, and constants EdgeCntThreshold, DataDutyWideCntThreshold, and DataDutyNarrowCntThreshold.

In the control unit 15, at first, in step S31, the values of variables EdgeCnt, DataDutyWideCnt, and DataDutyNarrowCnt are initialized, respectively, and after that, in step S32, the value of variable Edge is added cumulatively to variable EdgeCnt, the value of DataDutyWide is added cumulatively to variable DataDutyWideCnt, and the value of variable DataDutyNarrow is added cumulatively to variable DataDutyNarrowCnt for each of the calibration sample data XD.

In step S33, whether or not the value of variable EdgeCnt is equal to or greater than constant EdgeCntThreshold is determined. When it is determined that the value of variable EdgeCnt is less than constant EdgeCntThreshold in step S33, the process returns to step S32.

When it is determined that the value of variable EdgeCnt is equal to or greater than constant EdgeCntThreshold in step S33, whether or not the value of variable DataDutyWideCnt is equal to or greater than constant DataDutyWideCntThreshold is determined in step S34 and when the former is equal to or greater than the latter, it is determined that the duty of the data received by the reception device $20_n$ is wide (DataDutyWide). In step S35, whether or not the value of variable DataDutyNarrowCnt is equal to or greater than constant DataDutyNarrowCntThreshold is determined and when the former is equal to or greater than the latter, it is determined that the duty of the data received by the reception device $20_n$ is narrow (DataDutyNarrow). When neither is the case, it is determined that the duty of the data received by the reception device $20_n$ is within an allowable range (DataDutyDJust).

Figure 19:
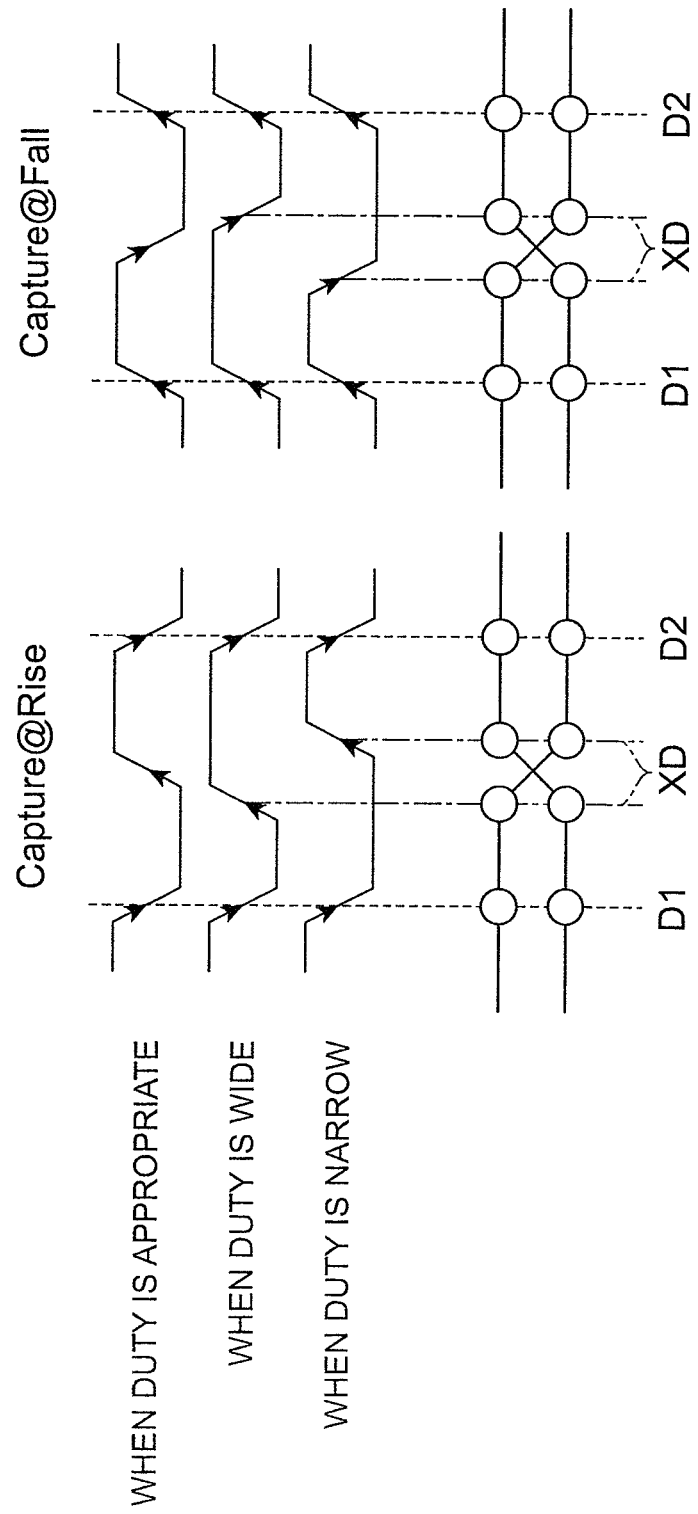
FIG. 19 is a diagram for explaining data used by the control unit 15 of the transmission device 10.
Figure 21:
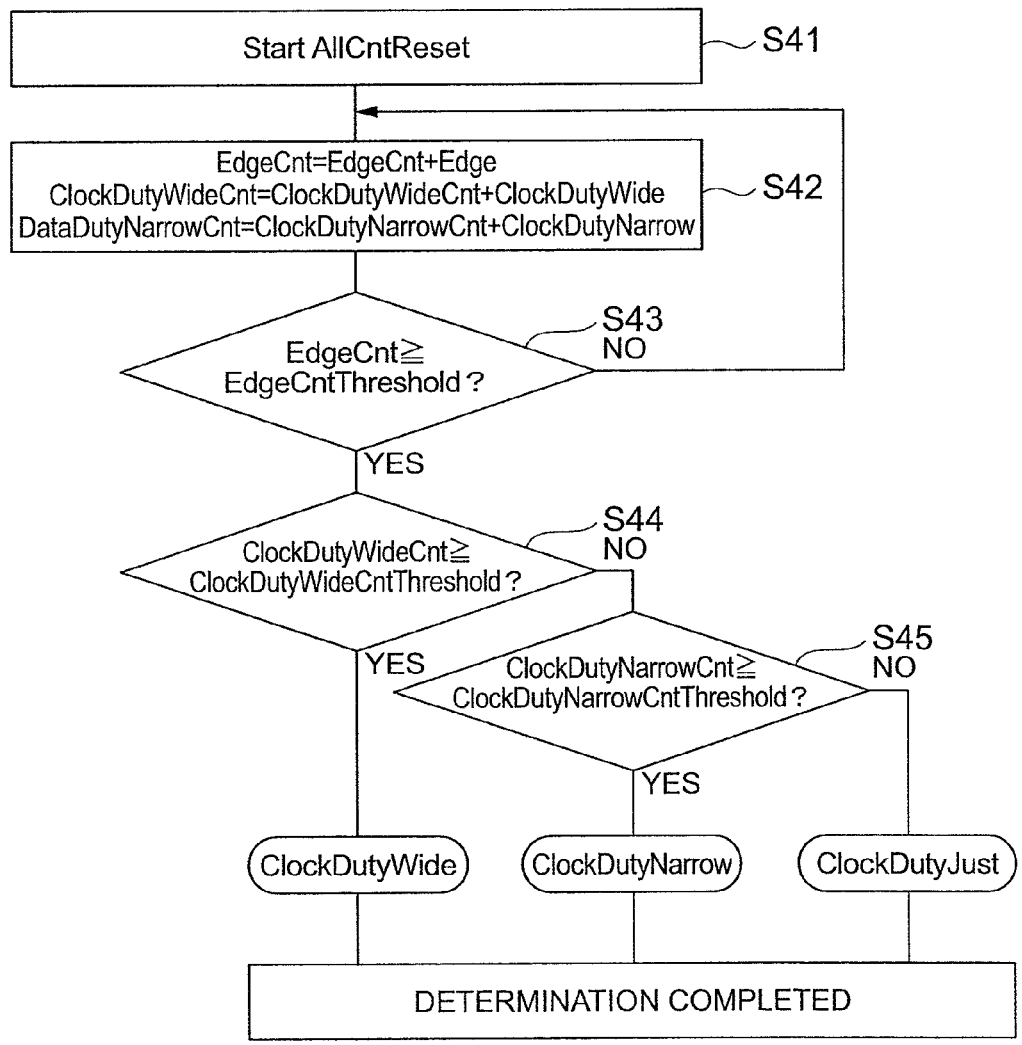
FIG. 21 is a flowchart for explaining an operation of the control unit 15 of the transmission device 10.

Next, using FIG. 19 to FIG. 21, a method of determining the duty of the clock at the time of reception by the reception device $20_n$ by the control unit 15 of the transmission device 10 having received calibration sample data from the reception device $20_n$ is explained. FIG. 19 is a diagram for explaining data used by the control unit 15 of the transmission device 10. FIG. 20 is a table for explaining an operation of the control unit 15 of the transmission device 10. FIG. 21 is a flowchart for explaining an operation of the control unit 15 of the transmission device 10.

As shown in FIG. 19, the control unit 15 of the transmission device 10 uses the calibration sample data XD, which is sent from the reception device $20_n$, of the calibration data sampled by the sampler unit 23 of the reception device $20_n$, the calibration data D1 of the bit immediately before the sampling of the calibration sample data XD, and the calibration data D2 of the bit immediately after the sampling of the calibration sample data XD. The calibration data D1, D2 are data transmitted by the transmission device 10 itself. The calibration sample data XD is obtained at the timings of both rise and fall of the clock, respectively, by the sampler unit 23.

As shown in FIG. 20, the control unit 15 detects whether or not there is data transition between the two bits before and after the sampling of the calibration sample data XD (Edge), whether or not the duty of the clock is wide at the time of reception by the reception device $20_n$ (ClockDutyWide), and whether or not the duty of the clock is narrow at the time of reception by the reception device $20_n$ (ClockDutyNarrow) based on the three pieces of the data D1, XD and D2. At this time, the determination of whether the duty of the clock is wide or narrow differs depending on the timing of the rise or the fall of the clock at which the calibration sample data XD is obtained by the sampler unit 23.

That is, the control unit 15 sets the value of variable Edge to 1 when there is data transition between the two bits D1, D2 or sets the value of variable Edge to 0 when not. The control unit 15 sets the value of variable ClockDutyWide to 1 when the duty of the clock is wide at the time of reception by the reception device $20_n$ or sets the value of variable ClockDutyWide to 0 when not. Further, the control unit 15 sets the value of variable ClockDutyNarrow to 1 when the duty of the clock is narrow at the time of reception by the reception device $20_n$ or sets the value of variable ClockDutyNarrow to 0 when not.

Then, the control unit 15 detects whether the duty of the clock received by the clock reception unit 22 of the reception device $20_n$ is wide or narrow based on each value of these variables Edge, ClockDutyWide, and ClockDutyNarrow. Specifically, as shown in FIG. 21, the control unit 15 performs the following processing using variables EdgeCnt, ClockDutyWideCnt, and ClockDutyNarrowCnt, and constants EdgeCntThreshold, ClockDutyWideCntThreshold, and ClockDutyNarrowCntThreshold.

In the control unit 15, at first, in step S41, the values of variables EdgeCnt, ClockDutyWideCnt, and ClockDutyNarrowCnt are initialized, respectively, and after that, in step S42, the value of variable Edge is added cumulatively to variable EdgeCnt, the value of ClockDutyWide is added cumulatively to variable ClockDutyWideCnt, and the value of variable ClockDutyNarrow is added cumulatively to variable ClockDutyNarrowCnt for each of the calibration sample data XD.

In step S43, whether or not the value of variable EdgeCnt is equal to or greater than constant EdgeCntThreshold is determined. When it is determined that the value of variable EdgeCnt is less than constant EdgeCntThreshold in step S43, the process returns to step S42.

When it is determined that the value of variable EdgeCnt is equal to or greater than constant EdgeCntThreshold in step S43, whether or not the value of variable ClockDutyWideCnt is equal to or greater than constant ClockDutyWideCntThreshold is determined in step S44 and when the former is equal to or greater than the latter, it is determined that the duty of the clock received by the reception device $20_n$ is wide (ClockDutyWide). In step S45, whether or not the value of variable ClockDutyNarrowCnt is equal to or greater than constant ClockDutyNarrowCntThreshold is determined and when the former is equal to or greater than the latter, it is determined that the duty of the clock received by the reception device $20_n$ is narrow (ClockDutyNarrow). When neither is the case, it is determined that the duty of the clock received by the reception device $20_n$ is within an allowable range (ClockDutyJust).

Next, using FIG. 22 to FIG. 27, the adjustments of the phase, data amplitude, data duty, and clock duty, respectively, by the control unit 15 of the transmission device 10 are explained. The control unit 15 makes each adjustment described above by controlling the data transmission unit 11 and the clock transmission unit 12 based on the determination results obtained by the procedures shown in FIG. 12, FIG. 15, FIG. 18, and FIG. 21 (Late, Early, Lock, Unlock, Overequalize, Underequalize, Justequalize, DataDutyWide, DataDutyNarrow, DataDutyJust, ClockDutyWide, ClockDutyNarrow, ClockDutyJust).

Figure 22:
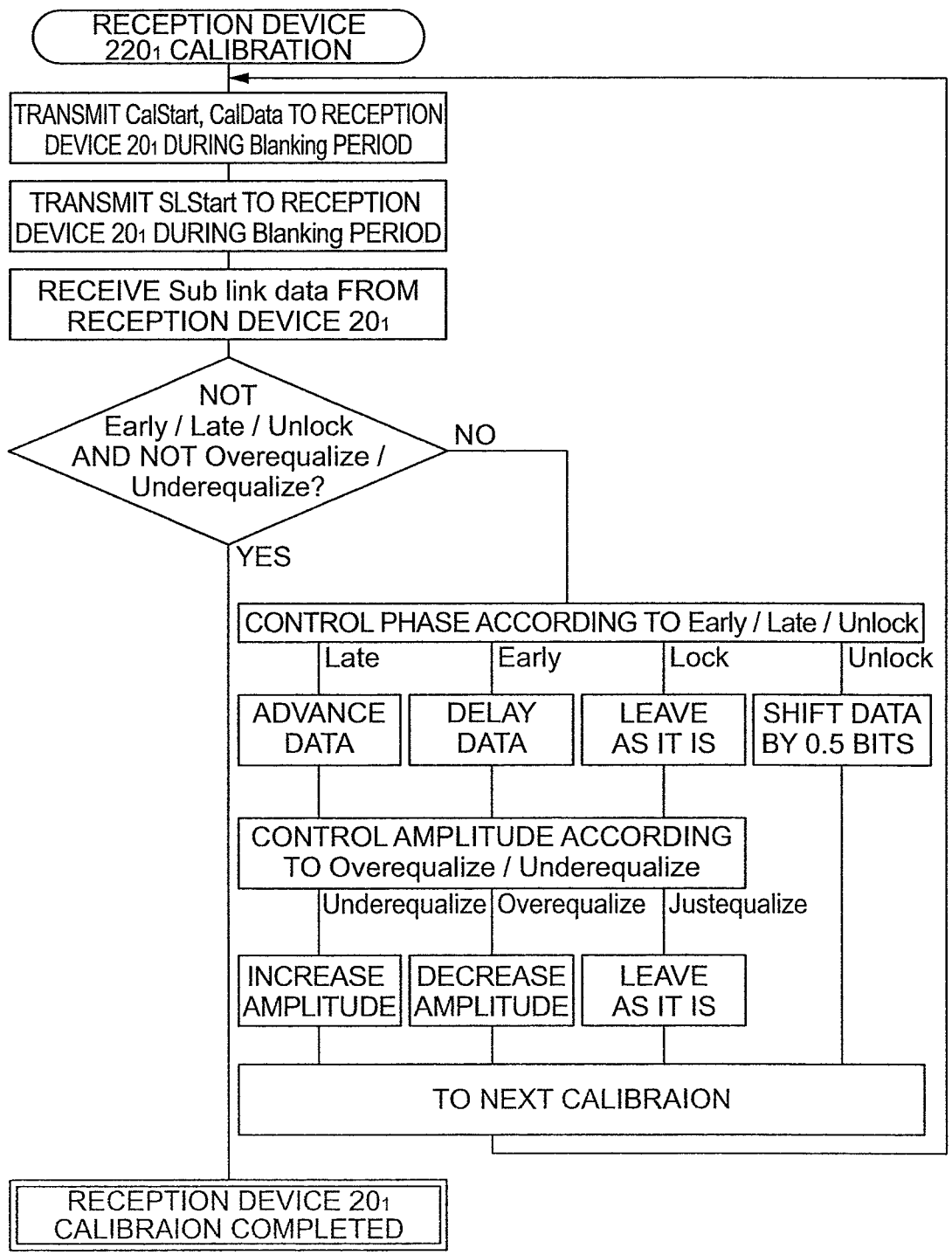
FIG. 22 is a flowchart for explaining a first adjustment example by the control unit 15 in the transmission device 10.

FIG. 22 is a flowchart for explaining a first adjustment example by the control unit 15 in the transmission device 10 according to the present embodiment. In the first adjustment example shown in this diagram, the control unit 15 causes the data transmission unit 11 to transmit the calibration start instruction data (CalStart) and the calibration data (CalData) to the reception device $20_n$ during the blanking period and then causes the data transmission unit 11 to transmit the transmission instruction data (SLStart). Then, the control unit 15 receives the calibration sample data (Sub link data) sent out from the reception device $20_n$ and received by the reception unit 14, makes the determinations described above, and makes adjustments by the following procedure based on the determination results.

When both variable Lock and variable Justequalize are significant values, that is, the phase difference between data and a clock received by the reception device $20_n$ is within the allowable range and the amplitude of the high-frequency component of the data is within the allowable range, the control unit 15 makes no adjustment for the buffer 111 or the phase shift unit 113 of the data transmission unit 11 included in the transmission unit $19_n$ corresponding to the reception device $20_n$ but performs processing for the next reception device $20_{n+1}$.

When either of variable Lock and variable Justequalize is not a significant value, the control unit 15 performs the following control.

When variable Late is a significant value (when the phase of the data is delayed with respect to the clock received by the reception device $20_n$), the control unit 15 advances the phase of the data by a predetermined amount with respect to the clock by making the adjustment for the phase shift unit 113 of the data transmission unit 11 included in the transmission unit $19_n$.

When variable Early is a significant value (when the phase of the data is advanced with respect to the clock received by the reception device $20_n$), the control unit 15 delays the phase of the data by a predetermined amount with respect to the clock by making the adjustment for the phase shift unit 113 of the data transmission unit 11 included in the transmission unit $19_n$.

When variable Lock is a significant value (when the phase difference between the data and the clock received by the reception device $20_n$ is in the allowable range), the control unit 15 makes no adjustment for the phase shift unit 113 of the data transmission unit 11 included in the transmission unit $19_n$.

When variable Unlock is a significant value (when the frequency of the clock and the bit rate of the data received by the reception device $20_n$ are in the unlocked state), the control unit 15 considerably changes the phase of the clock (for example, 0.5 bits) by making the adjustment for the phase shift unit 113 of the data transmission unit 11 included in the transmission unit $19_n$.

When variable Unlock is not a significant value, the control unit 15 further performs the following controls according to each value of variables Overequalize, Uderequalize, and Justequalize.

When variable Overequalize is a significant value (when the waveform distortion of the data is large because the amplitude of the high-frequency component of the data received by the reception device $20_n$ is large), the control unit 15 increases the amplitude of the data of the bit after the level transition of the data by a predetermined amount by making the adjustment for the buffer 111 of the data transmission unit 11 included in the transmission unit $19_n$.

When variable Underequalize is a significant value (when the waveform distortion of the data is large because the amplitude of the high-frequency component of the data received by the reception device $20_n$ is small), the control unit 15 reduces the amplitude of the data of the bit after the level transition of the data by a predetermined amount by making the adjustment for the buffer 111 of the data transmission unit 11 included in the transmission unit $19_n$.

When variable Justequalize is a significant value (when the amplitude of the high-frequency component of the data received by the reception device $20_n$ is within the allowable range), the control unit 15 makes no adjustment for the buffer 111 of the data transmission unit 11 included in the transmission unit $19_n$.

When variable DataDutyWide is a significant value (when the duty of the data received by the reception device $20_n$ is wide), the control unit 15 narrows the duty of the data by a predetermined amount by making the adjustment (for example, by adjusting the offset) for the buffer 111 of the data transmission unit 11 included in the transmission unit $19_n$.

When variable DataDutyNarrow is a significant value (when the duty of the data received by the reception device $20_n$ is narrow), the control unit 15 widens the duty of the data by a predetermined amount by making the adjustment (for example, by adjusting the offset) for the buffer 111 of the data transmission unit 11 included in the transmission unit $19_n$.

When variable DataDutyJust is a significant value (when the duty of the data received by the reception device $20_n$ is within the allowable range), the control unit 15 makes no adjustment for the buffer 111 of the data transmission unit 11 included in the transmission unit $19_n$.

When variable ClockDutyWide is a significant value (when the duty of the clock received by the reception device $20_n$ is wide), the control unit 15 narrows the duty of the clock by a predetermined amount by making the adjustment (for example, by adjusting the offset) for the buffer 121 of the clock transmission unit 12 included in the transmission unit $19_n$.

When variable ClockDutyNarrow is a significant value (when the duty of the clock received by the reception device $20_n$ is narrow), the control unit 15 widens the duty of the clock by a predetermined amount by making the adjustment (for example, by adjusting the offset) for the buffer 121 of the clock transmission unit 12 included in the transmission unit $19_n$.

When variable ClockDutyJust is a significant value (when the duty of the clock received by the reception device $20_n$ is within the allowable range), the control unit 15 makes no adjustment for the buffer 121 of the clock transmission unit 12 included in the transmission unit $19_n$.

When the above adjustment processing is completed, the control unit 15 causes the data transmission unit 11 to again transmit the calibration start instruction data (CalStart), the calibration data (CalData), and the transmission instruction data (SLStart) to the reception device $20_n$, receives the calibration sample data (Sub link data) sent out from the reception device $20_n$ and received by the reception unit 14 to make the above-described determinations, and makes the adjustments by the same procedure based on the determination results. Then, when both variable Lock and variable Justequalize become significant values, the control unit 15 exits the processing for the reception device $20_n$ and performs the same processing for the next reception device $20_{n+1}$.

Figure 23:
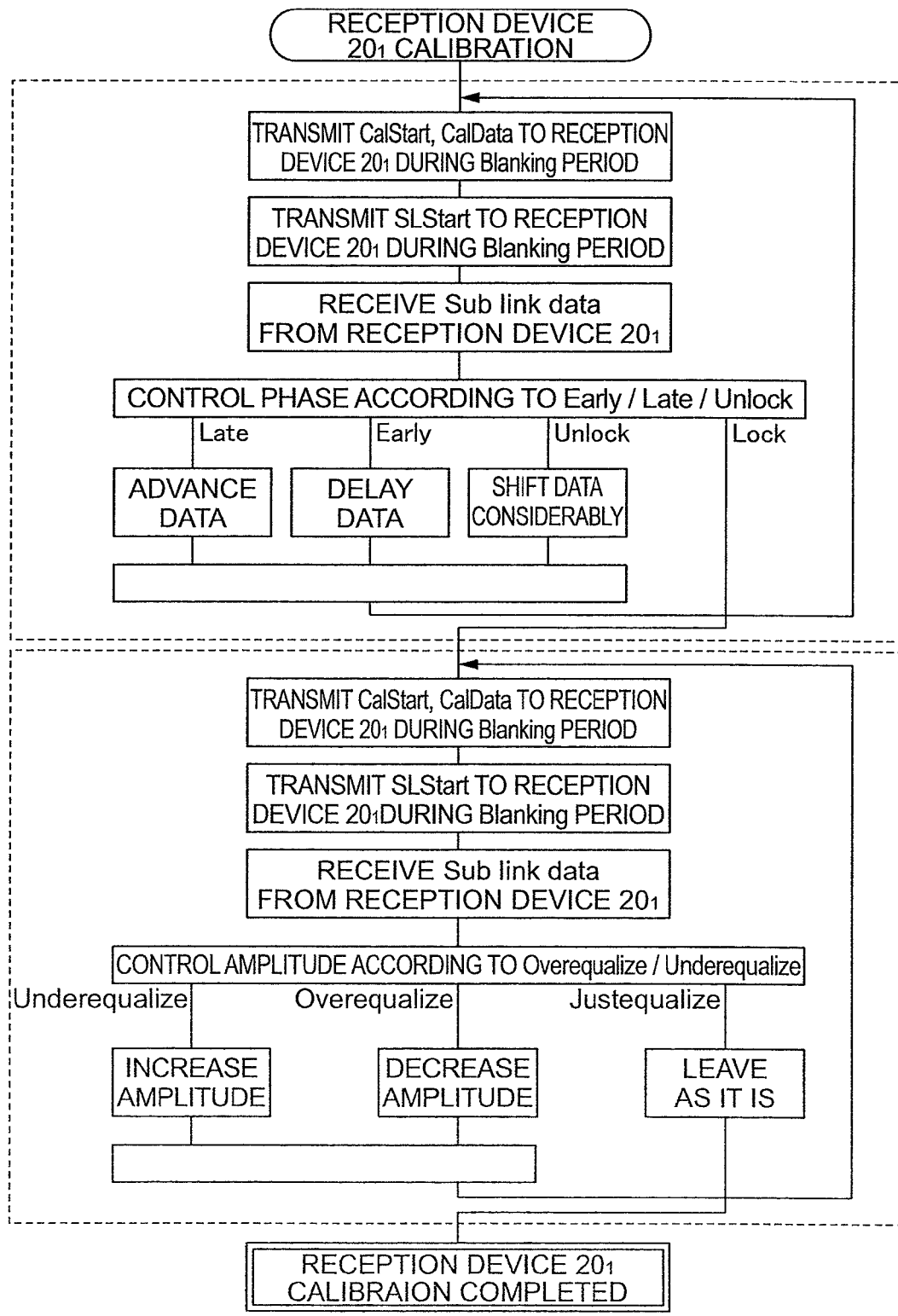
FIG. 23 is a flowchart for explaining a second adjustment example by the control unit 15 in the transmission device 10.

FIG. 23 is a flowchart for explaining a second adjustment example by the control unit 15 in the transmission device 10 according to the present embodiment. In the second adjustment example shown in this diagram, the control unit 15 repeats the transmission of the calibration start instruction data (CalStart), the calibration data (CalData), and the transmission instruction data (SLStart) to the reception device $20_n$, the reception of the calibration sample data (Sub link data) from the reception device $20_1$, and the adjustments made for the phase shift unit 113 according to whether any of variables Late, Early, and Unlock is a significant value until variable Lock becomes a significant value (the phase difference between data and a clock received by the reception device $20_n$ falls within the allowable range).

When variable Lock is a significant value, the control unit 15 repeats the transmission of the calibration start instruction data (CalStart), the calibration data (CalData), and the transmission instruction data (SLStart) to the reception device $20_n$, the reception of the calibration sample data (Sub link data) from the reception device $20_n$, and the adjustments made for the buffer 111 according to whether either of variables Overequalize and Underequalize is a significant value until variable Justequalize becomes a significant value (the amplitude of the high-frequency component of the data received by the reception device $20_n$ falls within the allowable range).

The control unit 15 repeats the transmission of the calibration start instruction data (CalStart), the calibration data (CalData), and the transmission instruction data (SLStart) to the reception device $20_n$, the reception of the calibration sample data (Sub link data) from the reception device $20_n$, and the adjustments made for the buffer 111 according to whether either of variables DataDutyWide and DataDutyNarrow is a significant value until variable DataDutyJust becomes a significant value (the duty of the data received by the reception device $20_n$ falls within the allowable range).

Further, the control unit 15 repeats the transmission of the calibration start instruction data (CalStart), the calibration data (CalData), and the transmission instruction data (SLStart) to the reception device $20_n$ the reception of the calibration sample data (Sub link data) from the reception device $20_n$, and the adjustments made for the buffer 121 according to whether either of variables ClockDutyWide and ClockDutyNarrow is a significant value until variable ClockDutyJust becomes a significant value (the duty of the clock received by the reception device $20_n$ falls within the allowable range).

The adjustments made for the phase shift unit 113 or the buffers 111, 121 in the second adjustment example are the same as those in the first adjustment example. Then, when all variables Lock, Justequalize, DataDutyJust, and ClockDutyJust become significant values, the control unit 15 exits the processing for the reception device $20_n$ and performs the same processing for the next reception device $20_{n+1}$.

Figure 24:
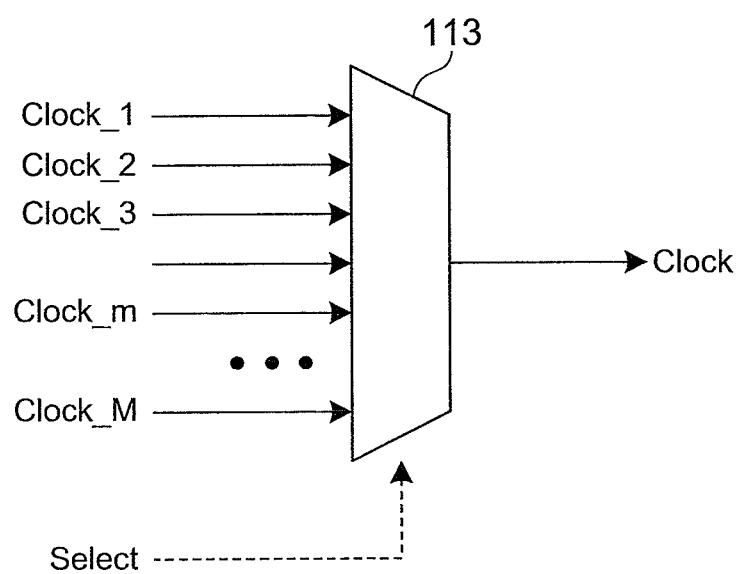
FIG. 24 is a diagram showing a configuration of a phase shift unit 113 of a data transmission unit 11 in the transmission device 10.
Figure 25:
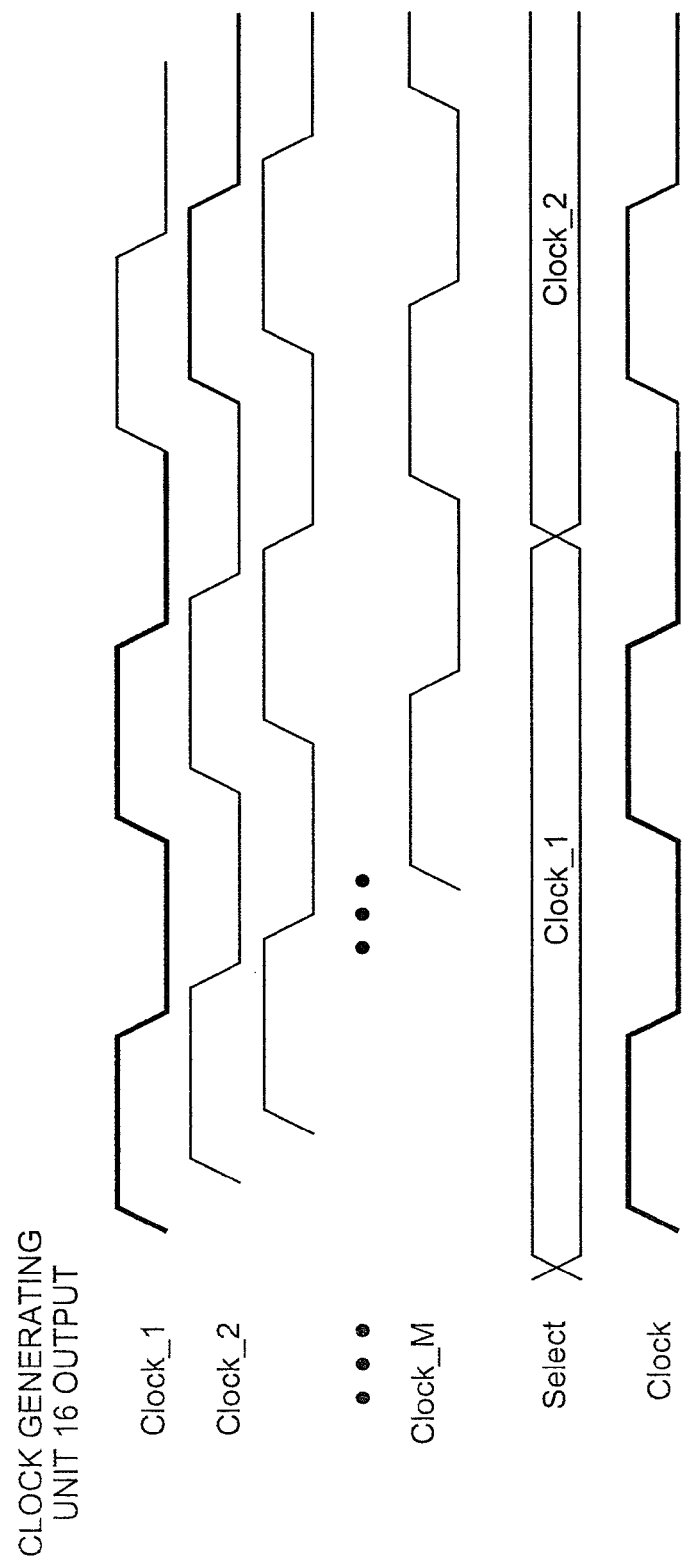
FIG. 25 is a diagram for explaining an operation of the phase shift unit 113 of the data transmission unit 11 in the transmission device 10.

FIG. 24 is a diagram showing a configuration of the phase shift unit 113 of the data transmission unit 11 in the transmission device 10 according to the present embodiment. FIG. 25 is a diagram for explaining an operation of the phase shift unit 113 of the data transmission unit 11 in the transmission device 10 according to the present embodiment. In this example, the clock generating unit 16 is, for example, a PLL frequency synthesizer and outputs clocks Clock_1 to Clock_M in M phases, the phases of which are different from one another by a predetermined amount. Then, the phase shift unit 113 receives a selection instruction signal Select output from the control unit 15 as well as the clocks Clock_1 to Clock_M in M phases output from the clock generating unit 16 and selectively outputs a clock Clock, among the clocks Clock_1 to Clock_M in M phase, instructed by the selection instruction signal Select to the flip-flop 112. Due to this, the phase difference between data and a clock sent out from the transmission device 10 is adjusted and the phase difference between the data and a clock received by the reception device $20_n$ falls within the allowable range.

Figure 26:
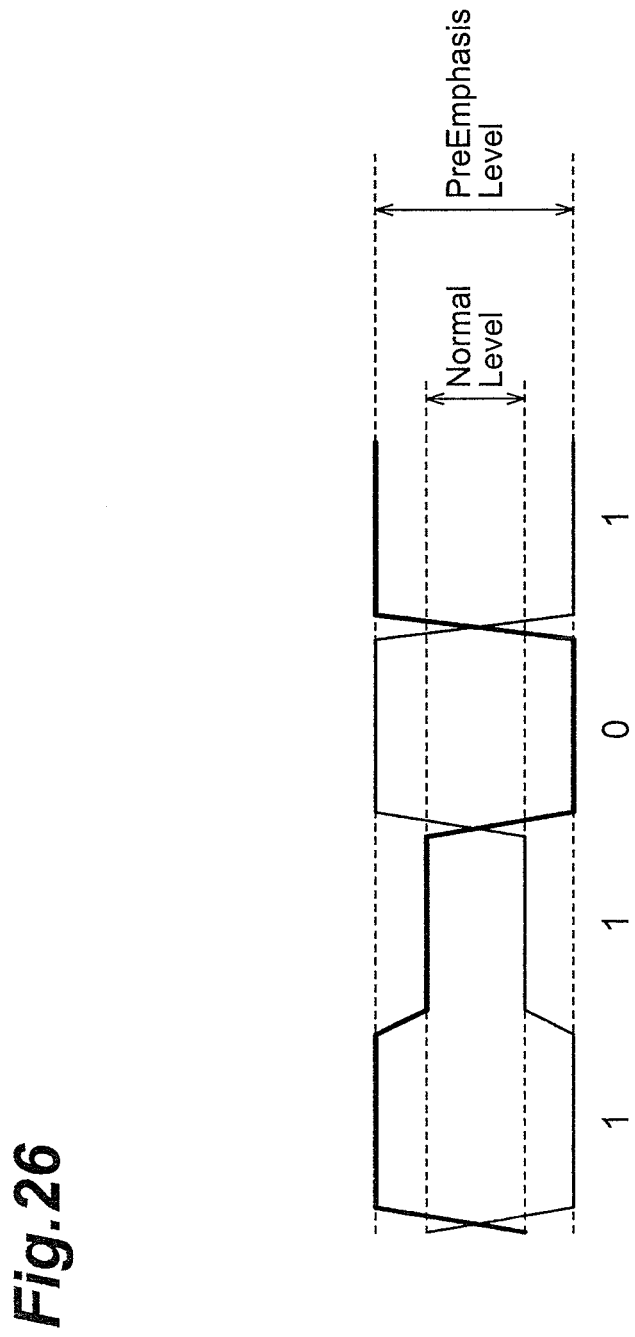
FIG. 26 is a waveform diagram for explaining an amplitude adjustment by a buffer 111 of the data transmission unit 11 in the transmission device 10.

FIG. 26 is a waveform diagram for explaining the amplitude adjustment by the buffer 111 of the data transmission unit 11 in the transmission device 10 according to the present embodiment. As shown in this diagram, by the instruction from the control unit 15, the buffer 111 increases the amplitude (PreEmphasis Level) of the data of the bit after the level transition of the data to be transmitted with respect to the amplitude (Normal Level) of the bit at the same level as that of the previous bit. Further, by the instruction from the control unit 15, the buffer 111 adjusts the amplitude (PreEmphasis Level) of the data of the bit after the level transition of the data to be transmitted. Due to this, the amplitude of the high-frequency component of the data sent out from the transmission device 10 is adjusted to an appropriate value and the amplitude of the high-frequency component of the data received by the reception device $20_n$ is adjusted to within the allowable range, and thereby, the distortion of the data is suppressed.

Figure 27:
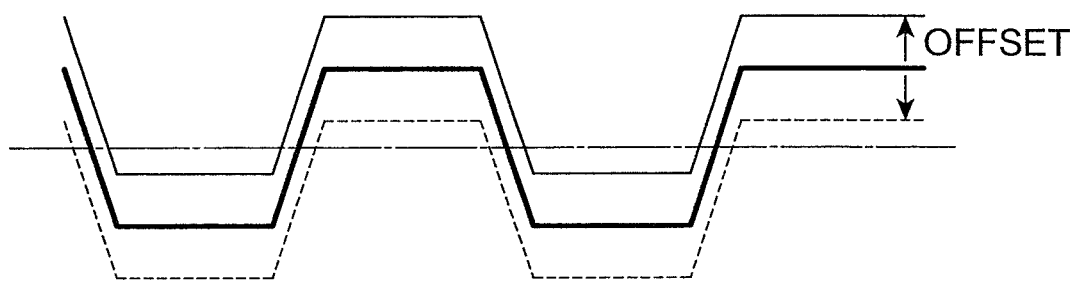
FIG. 27 is a waveform diagram for explaining data duty by the buffer 111 of the data transmission unit 11 in the transmission device 10.

FIG. 27 is a waveform diagram for explaining the data duty by the buffer 111 of the data transmission unit 11 in the transmission device 10 according to the present embodiment. As shown in this diagram, it is possible for the buffer 111 to adjust the duty of the data by adjusting the offset of the data to be output by the instruction from the control unit 15.

In the present embodiment, the adjustment of the phase between the data transmitted by the data transmission unit 11 and the clock transmitted by the clock transmission unit 12, the adjustment of the amplitude of the data transmitted by the data transmission unit 11, the adjustment of the duty of the data transmitted by the data transmission unit 11, and the adjustment of the duty of the clock transmitted by the clock transmission unit 12 are made in the transmission device 10 in the manner described above.

Then, as a result of these adjustments, in the reception device $20_n$, the phase difference between the data received by the reception unit 21 and the clock received by the clock reception unit 22 is adjusted to within the allowable range, the degree of the deterioration of the waveform of the data received by the data reception unit 21 is adjusted to within the allowable range, the duty of the data received by the data reception unit 21 is adjusted to within the allowable range, and the duty of the clock received by the clock transmission unit 22 is adjusted to within the allowable range. Consequently, in the present embodiment, it is made easy to receive the data and clock transmitted from the transmission device 10 and to correctly sample the data with the clock in the reception device $20_n$.

Further, in the image display system 1, for example, the reception devices $20_1$ to $20_N$ in large numbers are provided generally for one transmission device 10, however, in the present embodiment, the configuration of each reception device $20_n$ can be simplified by transmitting the calibration sample data obtained by each reception device $20_n$ sampling the calibration data and causing the transmission device 10 to make determinations and adjustments based on the calibration sample data, and therefore, it is possible to reduce the cost of the configuration of the entire system as well as to simplify it.

It is preferable for the control unit 15 to cause the data transmission unit 11 to output calibration data with a certain fixed pattern at the time of the detection and adjustment of the phase difference, deterioration of the waveform, data duty, and clock duty explained above using FIG. 9 to FIG. 27, and by doing so, the configuration can be simplified. Further, it is preferable for the control unit 15 to cause the data transmission unit 11 to output calibration data configured so that the number of the items (rise/fall of data, rise/fall of clock, whether the values of the two bits of the data before sampling are different/the same) in opposition to each other at the time of the sampling by the sampler unit 23 of the reception device $20_n$ is the same.

The embodiments described above are suitable to the case where the phase difference between data and a clock in the reception device $20_n$ is less than ±0.5 bits and when the phase difference is equal to or greater than ±0.5 bits, it is difficult to adjust the phase or data amplitude. Because of this, when the phase difference between data and a clock in the reception device $20_n$ is equal to or greater than ±0.5 bits, it is recommended to perform the following shown in FIG. 28 or FIG. 29.

Figure 28:
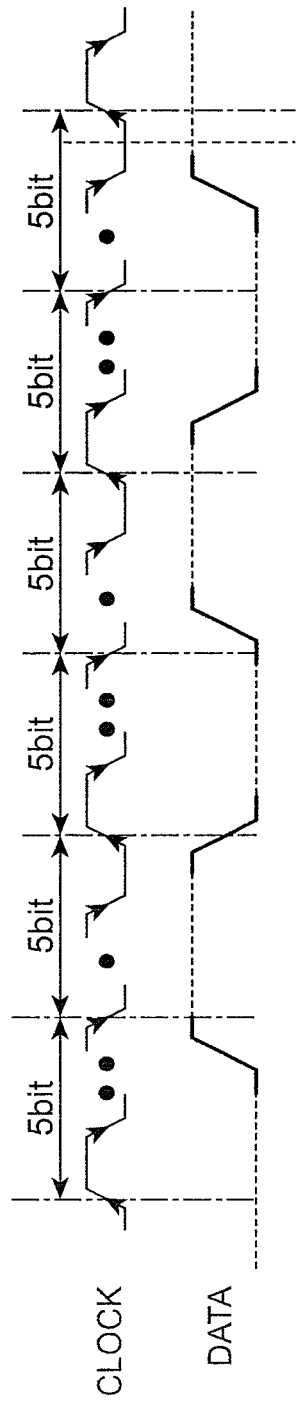
FIG. 28 is a waveform diagram for explaining a first method of phase difference detection and phase adjustment when a phase difference between data and a clock in the reception device $20_n$ is ±0.5 bits or more.

FIG. 28 is a waveform diagram for explaining a first method of phase difference detection and phase adjustment when the phase difference between data and a clock in the reception device $20_n$ is equal to or greater than ±0.5 bits. As shown in this diagram, the calibration data transmitted from the transmission device 10 to the reception device $20_n$ is data in which the same code continues for a somewhat long time (for example, about five bits) and the amount of shift of transition timing with respect to the timing (rise or fall of the clock) of the data sampling changes little by little. It is possible for the control unit 15 of the transmission device 10 to roughly adjust the phase between the data and the clock at the time of transmission by detecting the amount of shift of transition timing of the data with which the phase difference between the data and the clock in the reception device $20_n$ roughly falls within the allowable range based on the calibration sample data received from the reception device $20_n$. After the rough adjustment of the phase, various adjustments are made in the method described above.

Figure 29:
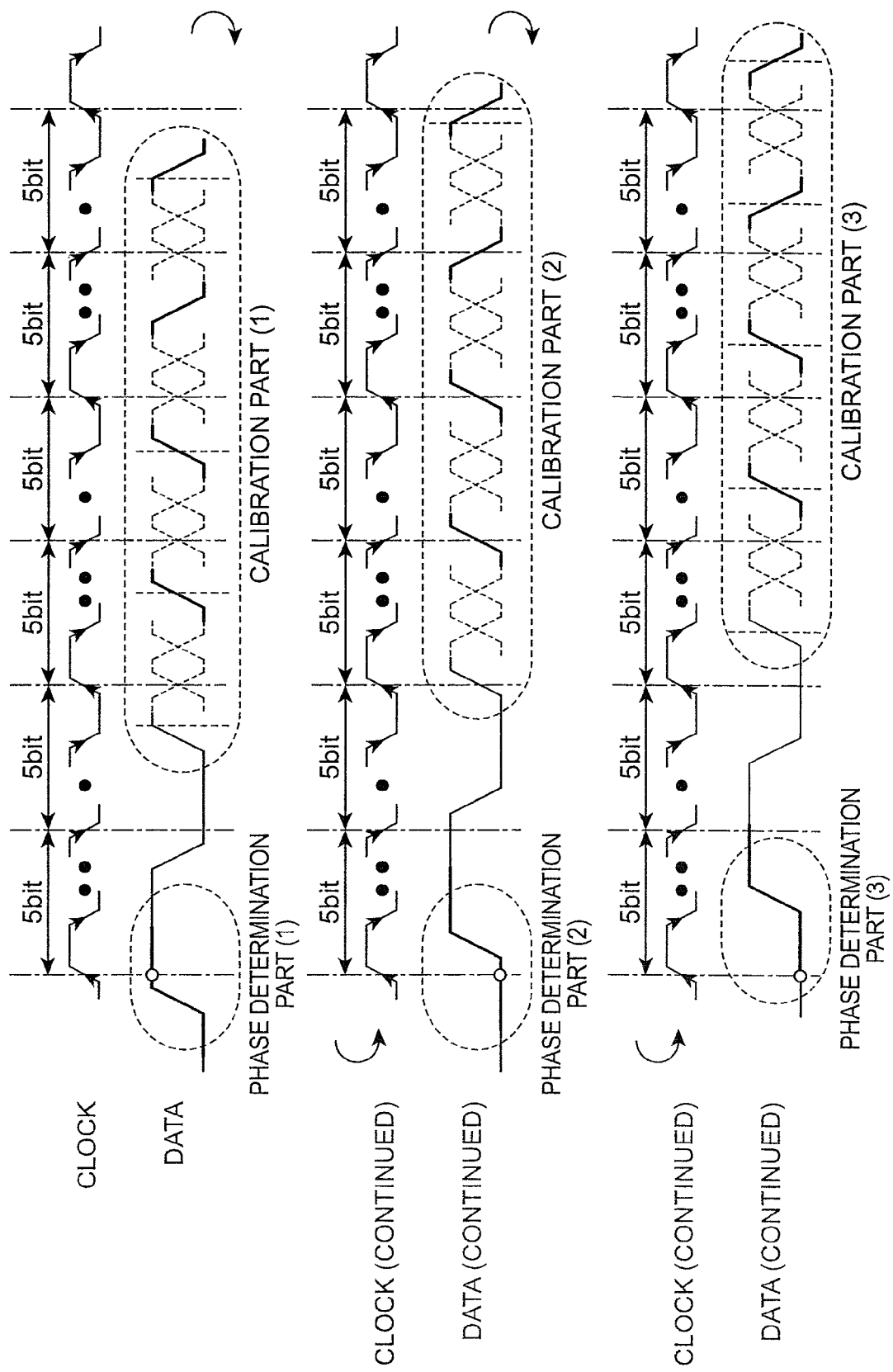
FIG. 29 is a waveform diagram for explaining a second method of phase difference detection and phase adjustment when a phase difference between data and a clock in the reception device $20_n$ is ±0.5 bits or more.

FIG. 29 is a waveform diagram for explaining a second method of phase difference detection and phase adjustment when the phase difference between data and a clock in the reception device $20_n$ is equal to or greater than ±0.5 bits. As shown in this diagram, the calibration data transmitted from the transmission device 10 to the reception device $20_n$ is configured by a plurality of sets of a phase determination part and a calibration part. The phase determination part of each set of the calibration data is configured into a form in which a pattern in which the same code continues in two bits or more is shifted in phase little by little. The calibration part of each set of the calibration data is a part in which the amount of shift of transition timing with respect to the timing (rise or fall of the clock) of the data sampling changes little by little. Preferably, the phase of the phase determination part is shifted with respect to the calibration part by 0.5 bits.

The control unit 15 of the transmission device 10 determines the phase difference between the clock and the data based on the calibration sample data that the reception device $20_n$ obtained by sampling the phase determination part of the calibration data and makes the various adjustments in the above-described method using the part (middle part in the diagram) in phase in the calibration part. In the example in this diagram, the calibration sample data obtained by sampling the phase determination parts (1), (2), (3), respectively, changes to the H level, L level, and L level, and therefore, the calibration part (2) following the phase determination part (2) is used. The phase determination parts may come together in a part of the calibration data or may be arranged dispersed as shown in this diagram.

Figure 30:
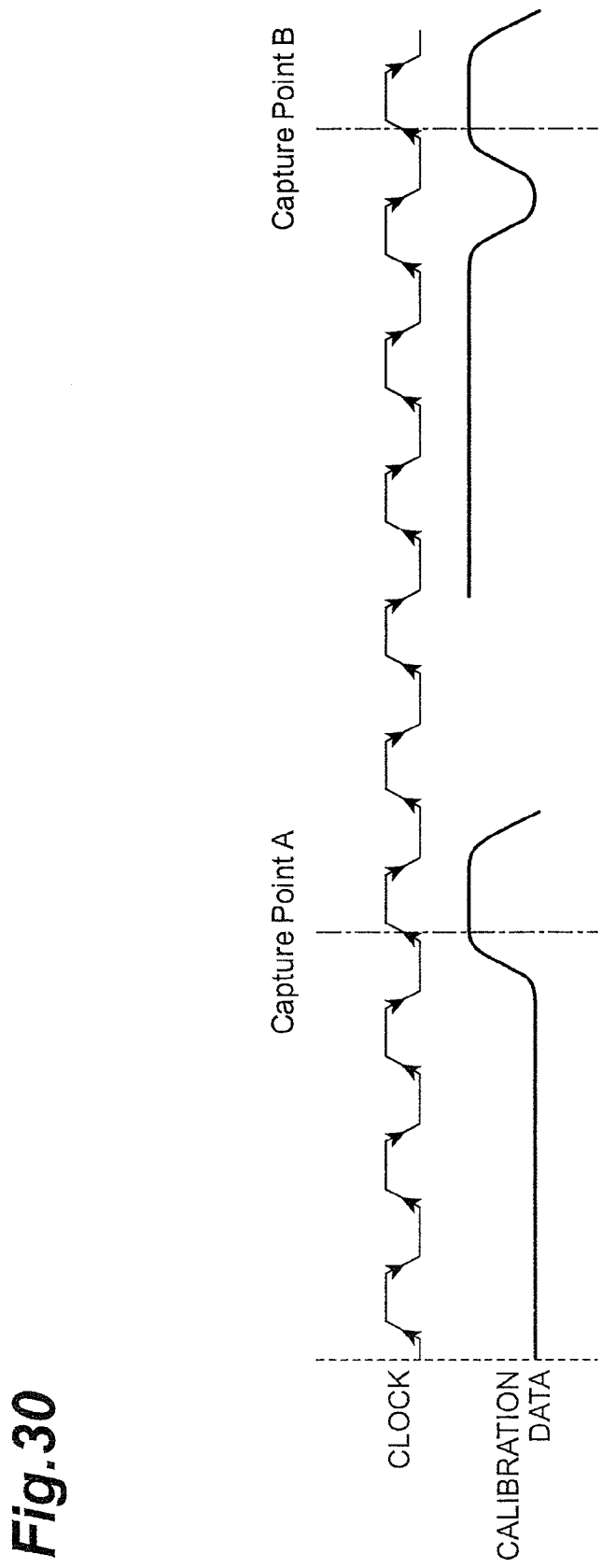
FIG. 30 is a diagram showing another example of a clock and calibration data transmitted from the transmission device 10 to the reception device $20_n$.

Further, the calibration data and the clock transmitted from the transmission device 10 to the reception device $20_n$ may not be shifted in phase compared to when other data is transmitted. In this case, for example, as shown in FIG. 30, if calibration data, in which data transition exists after the same code continues in a predetermined number of bits (number of bits greater than the maximum number of bits in which the same code continues in the normal data), is sent out from the transmission device 10, the waveform of the data is considerably deteriorated and data transition is delayed in the reception device $20_n$ (Capture Point A in the diagram). If calibration data, in which data transition exists continuously after the same code continues in a predetermined number of bits, is sent out from the transmission device 10, data transmission is advanced in the reception device $20_n$ (Capture Point B in the diagram). It is possible to keep the transmission quality by making an adjustment so that reception can be performed correctly in the reception device $20_n$ even before and after the data transition.

Figure 31:
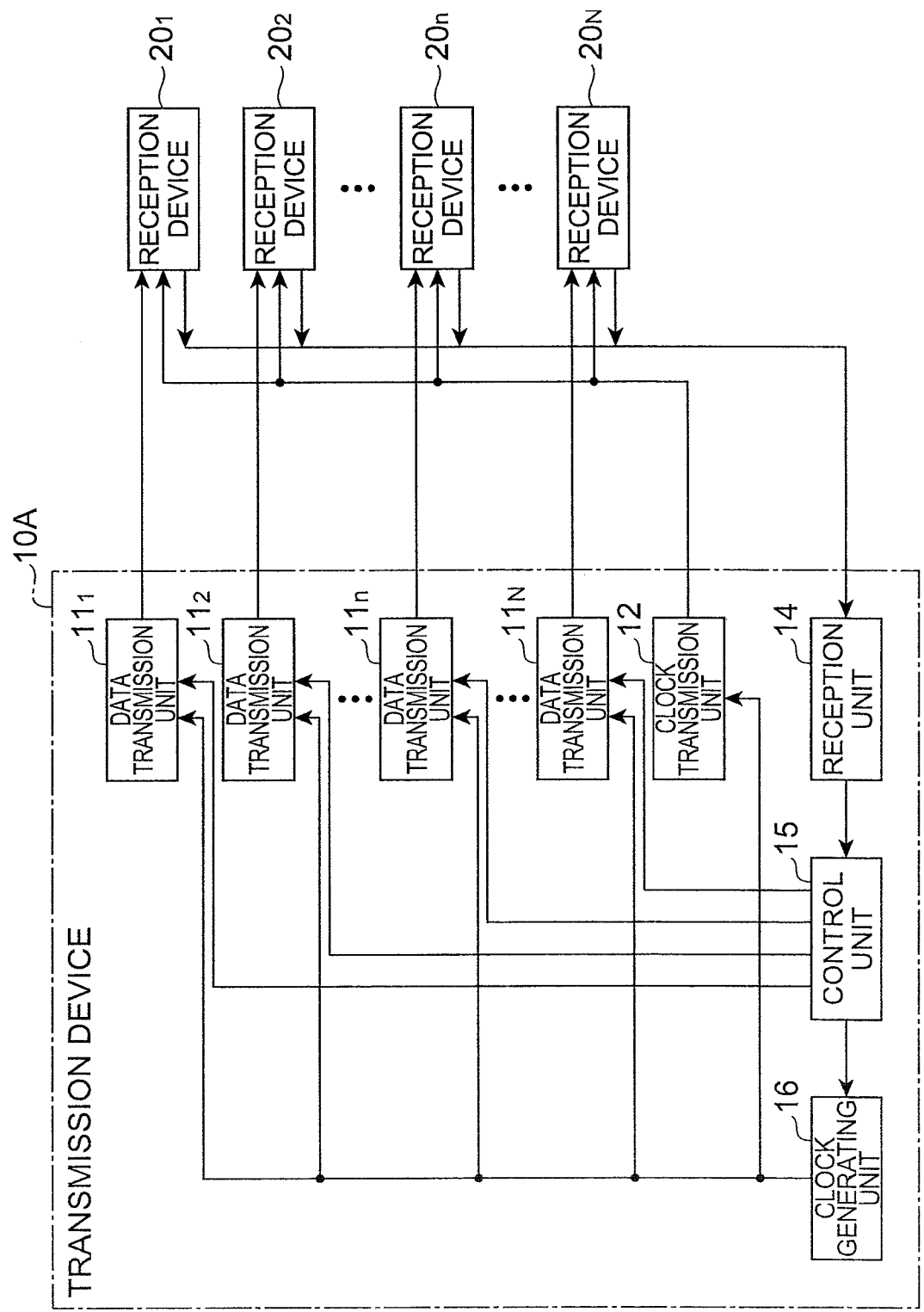
FIG. 31 is a diagram showing an outline configuration of a transmission device 10A, which is a modified example.

Next, using FIG. 31, a modified example of the transmission device 10 according to the present embodiment is explained. FIG. 31 is a diagram showing an outline configuration of a transmission device 10A, which is a modified example. The transmission device 10 in the embodiments described above comprises N sets (N is an integer not less than 2) of the data transmission unit 11 and the clock transmission unit 12 and in each set, the phase of the data is adjusted with respect to the clock. Consequently, it is possible to make common the clock transmission unit. Because of this, the transmission device 10A, which is a modified example, shown in FIG. 31 comprises N data transmission units $11_1$ to $11_N$ and one clock transmission unit 12. In this diagram, the schematic representation of the encoder unit is omitted.

Each of the N data transmission units $11_1$ to $11_N$ has the same configuration as that of the data transmission unit 11 in the embodiments described above. The data transmission unit $11_n$ and the reception device $20_n$ correspond to each other in a one-to-one manner. The clock transmission unit 12 has the same configuration as that of the clock transmission unit 12 in the embodiments described above.

The control unit 15 adjusts the phase between the data transmitted by the data transmission unit $11_n$ and the clock transmitted by the clock transmission unit 12, adjusts the amplitude of the data transmitted by the data transmission unit $11_n$, adjusts the duty of the data transmitted by the data transmission unit $11_n$, and adjusts the duty of the clock transmitted by the clock transmission unit 12 based on the calibration sample data transmitted from the reception device $20_n$ and received by the reception unit 14.

In this modified example, it is possible to make common the signal line to transmit a clock from the transmission device 10A to the N reception devices $20_1$ to $20_N$, and therefore, it is possible to reduce the number of signal lines between the transmission device 10A and the N reception devices $20_1$ to $20_N$.

REFERENCE SIGNS LIST

1 . . . image display system
10, 10A . . . transmission device
11 . . . data transmission unit
12 . . . clock transmission unit
13 . . . encoder unit 14 ... reception unit
15 ... control unit
16 ... clock generating unit
19 ... transmission unit
20 ... reception device
21 ... data reception unit
22 ... clock reception unit
23 ... sampler unit
24 ... decoder unit
25 ... storage unit
26 ... transmission unit
30 ... image display unit
31 ... signal line

The invention claimed is:

1. A transmission device that transmits data and a clock to a reception device, the transmission device comprising:
a data transmission unit that transmits data to the reception device;
a clock transmission unit that transmits a clock to the reception device;
a reception unit that receives data from the reception device; and
a control unit that controls data transmission by the data transmission unit and clock transmission by the clock transmission unit, wherein
the control unit causes the data transmission unit to transmit
normal data,
calibration data to detect a data reception state or a clock reception state in the reception device,
calibration start instruction data to instruct the reception device to start transmission of the calibration data, and
transmission instruction data to instruct the reception device to send out calibration sample data that the reception device obtained by sampling the calibration data,
respectively, to the reception device at predetermined timings; and
the control unit controls, when the reception unit receives the calibration sample data sent out from the reception device, any one or more of
an adjustment of a phase between the data transmitted by the data transmission unit and the clock transmitted by the clock transmission unit,
an adjustment of an amplitude of the data transmitted by the data transmission unit,
an adjustment of a duty of the data transmitted by the data transmission unit, and
an adjustment of a duty of the clock transmitted by the clock transmission unit
based on the received calibration sample data.

2. The transmission device according to claim 1, wherein the control unit causes the data transmission unit to transmit the calibration data in which an inter-bit transition exists in a position shifted by an amount corresponding to less than one bit relative to clock transmission by the clock transmission unit when compared to causing the data transmission unit to transmit the normal data, the calibration start instruction data, and the transmission instruction data, respectively.

3. The transmission device according to claim 1, wherein the control unit causes the data transmission unit to transmit the calibration data in which an inter-bit transition exists in a position shifted by an amount corresponding to 0.5 bits relative to clock transmission by the clock transmission unit when compared to causing the data transmission unit to transmit the normal data, the calibration start instruction data, and the transmission instruction data, respectively.

4. The transmission device according to claim 1, wherein the control unit sets a frequency of a clock caused to be transmitted from the clock transmission unit to half a bit rate of data caused to be transmitted from the data transmission unit.

5. The transmission device according to claim 1, wherein the control unit causes the data transmission unit to transmit data in which a same code continues in a predetermined number of bits or more to the reception device as the calibration start instruction data.

6. The transmission device according to claim 1, comprising a plurality of sets of the data transmission unit and the clock transmission unit.

7. The transmission device according to claim 1, comprising a plurality of the data transmission units and the one clock transmission unit.

8. A reception device that receives data and a clock from a transmission device, the reception device comprising:
a data reception unit that receives data from the transmission device;
a clock reception unit that receives a clock from the transmission device;
a sampler unit that samples data received by the data reception unit with the clock received by the clock reception unit and outputs data obtained by the sampling;
a decoder unit that decodes data output from the sampler unit;
a storage unit that stores part of data output from the sampler unit; and
a transmission unit that transmits data stored by the storage unit, wherein
the data reception unit receives
normal data,
calibration data to detect a data reception state in the data reception unit or a clock reception state in the clock reception unit,
calibration start instruction data to instruct the start of reception of the calibration data, and
transmission instruction data to instruct the transmission unit to send out calibration sample data that the sampler unit obtained by sampling the calibration data,
respectively, from the transmission device at predetermined timings, and
the decoder unit causes, when data output from the sampler unit is the calibration start instruction data, the storage unit to store calibration sample data that the sampler unit obtained afterward by sampling the calibration data and further causes, when data output afterward from the sampler unit is the transmission instruction data, the transmission unit to send out the calibration sample data stored by the storage unit.

9. The reception device according to claim 8, wherein the data reception unit receives the calibration data from the transmission device in which an inter-bit transition exists in a position shifted by an amount corresponding to less than one bit relative to a clock received by the clock reception unit when compared to receiving the normal data, the calibration start instruction data, and the transmission instruction data, respectively, from the transmission device.

10. The reception device according to claim 8, wherein the data reception unit receives the calibration data from the transmission device in which an inter-bit transition exists in a position shifted by an amount corresponding to 0.5 bits relative to a clock received by the clock reception unit when compared to receiving the normal data, the calibration start instruction data, and the transmission instruction data, respectively, from the transmission device.

11. The reception device according to claim 8, wherein the sampler unit samples data received by the data reception unit at timings of both rise and fall of the clock received by the clock reception unit.

12. The reception device according to claim 8, wherein the decoder unit recognizes data, of the data output from the sampler unit, in which a same code continues in a predetermined number of bits or more, as the calibration start instruction data.

13. A transmission/reception system comprising:
a transmission device; and
a reception device,
wherein the transmission device is one that transmits data and a clock to the reception device,
the transmission device including:
a data transmission unit that transmits data to the reception device;
a clock transmission unit that transmits a clock to the reception device;
a reception unit that receives data from the reception device; and
a control unit that controls data transmission by the data transmission unit and clock transmission by the clock transmission unit, and
the control unit causes the data transmission unit to transmit
normal data,
calibration data to detect a data reception state or a clock reception state in the reception device,
calibration start instruction data to instruct the reception device of start transmission of the calibration data, and
transmission instruction data to instruct the reception device to send out calibration sample data that the reception device obtained by sampling the calibration data,
respectively, to the reception device at predetermined timings; and
the control unit controls, when the reception unit receives the calibration sample data sent out from the reception device, any one or more of
an adjustment of a phase between the data transmitted by the data transmission unit and the clock transmitted by the clock transmission unit,
an adjustment of an amplitude of the data transmitted by the data transmission unit, an adjustment of a duty of the data transmitted by the data transmission unit, and
an adjustment of a duty of the clock transmitted by the clock transmission unit based on the received calibration sample data, and wherein
the reception device is one that receives data and a clock from the transmission device,
the reception device including:
a data reception unit that receives data from the transmission device;
a clock reception unit that receives a clock from the transmission device;
a sampler unit that samples data received by the data reception unit with the clock received by the clock reception unit and outputs data obtained by the sampling;
a decoder unit that decodes data output from the sampler unit;
a storage unit that stores part of data output from the sampler unit; and
a transmission unit that transmits data stored by the storage unit, wherein
the data reception unit receives
normal data,
calibration data to detect a data reception state in the data reception unit or a clock reception state in the clock reception unit,
calibration start instruction data to instruct the start of reception of the calibration data, and
transmission instruction data to instruct the transmission unit to send out calibration sample data that the sampler unit obtained by sampling the calibration data,
respectively, from the transmission device at predetermined timings, and
the decoder unit causes, when data output from the sampler unit is the calibration start instruction data, the storage unit to store calibration sample data that the sampler unit obtained afterward by sampling the calibration data and further causes, when data output afterward from the sampler unit is the transmission instruction data, the transmission unit to send out the calibration sample data stored by the storage unit,
the data reception unit of the reception device receives the data transmitted by the data transmission unit of the transmission device,
the clock reception unit of the reception device receives the clock transmitted by the clock transmission unit of the transmission device, and
the reception unit of the transmission device receives the calibration sample data transmitted by the transmission unit of the reception device.

14. The transmission/reception system according to claim 13, wherein
the transmission device includes a plurality of sets of the data transmission unit and the clock transmission unit,
a number of the reception devices is two or more,
the plurality of sets of the data transmission unit and the clock transmission unit included in the transmission device and the two or more reception devices correspond to each other in a one-to-one manner,
each of the data reception units of the two or more reception devices receives data transmitted by the corresponding data transmission unit included in the transmission device,
each of the clock reception units of the two or more reception devices receives a clock transmitted by the corresponding clock transmission unit included in the transmission device, and
the reception unit of the transmission device receives calibration sample data transmitted by each of the transmission units of the two or more reception devices.

15. The transmission/reception system according to claim 14, wherein
the reception unit of the transmission device receives calibration sample data transmitted by each of the transmission units of the two or more reception devices via a common signal line.

16. The transmission/reception system according to claim 13, wherein
the transmission device includes a plurality of the data transmission units and the one clock transmission unit,
a number of the reception devices is two or more,
the plurality of the data transmission units included in the transmission device and the two or more reception devices correspond to each other in a one-to-one manner, each of the data reception units of the two or more reception devices receives data transmitted by the corresponding data transmission unit included in the transmission device, each of the clock reception units of the two or more reception devices receives the clock transmitted by the clock transmission unit of the transmission device, and the reception unit of the transmission device receives calibration sample data transmitted by each of the transmission units of the two or more reception devices.

17. The transmission/reception system according to claim 16, wherein the reception unit of the transmission device receives calibration sample data transmitted by each of the transmission units of the two or more reception devices via a common signal line.

18. An image display system, comprising:

a transmission/reception system according to claim 13; and an image display unit that displays an image based on data received by each of a plurality of reception devices included in the transmission/reception system.

* * * * *